(12) United States Patent
Jordan

(10) Patent No.: US 9,842,317 B2
(45) Date of Patent: Dec. 12, 2017

(54) METHODS, SYSTEMS, AND APPARATUS FOR SCHEDULING APPOINTMENTS

(71) Applicant: Brandon Jordan, Alexandria, VA (US)

(72) Inventor: Brandon Jordan, Alexandria, VA (US)

(*) Notice: Subject to any disclaimer, the term of this patent is extended or adjusted under 35 U.S.C. 154(b) by 390 days.

(21) Appl. No.: 13/902,908

(22) Filed: May 27, 2013

(65) Prior Publication Data

US 2014/0164043 A1    Jun. 12, 2014

Related U.S. Application Data

(60) Provisional application No. 61/652,255, filed on May 28, 2012.

(51) Int. Cl.
*G06Q 10/00* (2012.01)
*G06Q 10/10* (2012.01)

(52) U.S. Cl.
CPC ................. *G06Q 10/1095* (2013.01)

(58) Field of Classification Search
CPC .......... G06Q 10/00; G06C 40/00; G06F 17/60
USPC ....................................... 705/7.19
See application file for complete search history.

(56) References Cited

U.S. PATENT DOCUMENTS

| | | |
|---|---|---|
| 4,769,796 A | 9/1988 | Levine |
| 4,783,800 A | 11/1988 | Levine |
| 5,113,380 A | 5/1992 | Levine |
| 5,270,920 A | 12/1993 | Pearse et al. |
| 5,519,606 A | 5/1996 | Frid-Nielsen et al. |
| 5,606,695 A | 2/1997 | Dworzecki |
| 5,692,125 A | 11/1997 | Schloss et al. |
| 5,790,974 A | 8/1998 | Tognazzini |
| 5,848,395 A | 12/1998 | Edgar et al. |
| 6,035,278 A | 3/2000 | Mansour |
| 6,578,005 B1 | 6/2003 | Lesaint et al. |
| 7,343,312 B2 | 3/2008 | Capek et al. |
| 7,487,105 B2 | 2/2009 | Jacobs et al. |
| 7,869,941 B2 | 1/2011 | Coughlin et al. |
| 7,941,133 B2* | 5/2011 | Aaron et al. .................. 455/418 |
| 8,892,741 B2* | 11/2014 | Lipari ................ G06Q 10/1091 705/5 |

(Continued)

OTHER PUBLICATIONS

Kjeldskov, et al., "Designing TramMatea Context-Aware Mobile System Supporting Use of Public Transportation", Jun. 2003, pp. 14, Publisher: ACM, Published in: AU.

(Continued)

*Primary Examiner* — Romain Jeanty
(74) *Attorney, Agent, or Firm* — David P. Lentini

(57) ABSTRACT

Methods, systems, and apparatus for scheduling appointments between a user and a provider are described. In one aspect, a requested appointment including an requested appointment location and information defining at least one period of time is received from a user. Computer processor instructions are executed to identify at least one current appointment and location during the period. Still more computer processor instructions are executed to determine an interval of time between the current appointment and the requested appointment based at least in part on the location of the current appointment and the requested appointment location, and further to determine at least one available time option for scheduling the requested appointment based at least in part on the interval of time. The available time option(s) is (are) then returned to the user.

40 Claims, 30 Drawing Sheets

(56) References Cited

U.S. PATENT DOCUMENTS

| | | | |
|---|---|---|---|
| 2002/0131572 A1* | 9/2002 | Paradis | G06F 19/327 379/200 |
| 2005/0119927 A1 | 6/2005 | Patel | |
| 2007/0208604 A1 | 9/2007 | Purohit et al. | |
| 2007/0226035 A1 | 9/2007 | Doss et al. | |
| 2007/0282656 A1 | 12/2007 | Battcher et al. | |
| 2008/0114638 A1 | 5/2008 | Colliau et al. | |
| 2008/0167938 A1 | 7/2008 | Meisels et al. | |
| 2010/0070296 A1 | 3/2010 | Massoumi et al. | |
| 2010/0293029 A1 | 11/2010 | Olliphant | |
| 2011/0022441 A1 | 1/2011 | Robertson et al. | |
| 2011/0077860 A1 | 3/2011 | Coughlin et al. | |
| 2012/0191501 A1* | 7/2012 | Olliphant | 705/7.19 |

OTHER PUBLICATIONS

Hoch, et al., "A User-Centric Approach for Efficient Daily Mobility Planning in E-Vehicle Infrastructure Networks", "Advanced Microsystems for Automotive Applications 2011", 2011, pp. 186-198, Publisher: Springer-Verlag Berlin Heidelberg, Published in: DE.

Kjeldskov, et al., "Designing and Evaluating Buster an Indexical Mobile Travel Planner for Public Transportation", "OzCHI Proceedings", 2007, pp. 25-28, Publisher: ACM, Published in: AU.

Yang, S., "The Design and Implementation of a Scheduler and Route Planner for Wheelchair Users", "The Design and Implementation of a Scheduler and Route Planner for Wheelchair Users (Master's Thesis)", Dec. 2006, Publisher: U. British Columbia, Published in: CA.

Douma, et al., "Barge rotation planning and quay scheduling in the port of Rotterdam", "Beta working paper", May 15, 2007, Publisher: University of Twente, The Netherlands, Published in: NE.

Cameron and Grantham, "TimeToGo: A Mobile Application for Departure Alerts Based on Google Calendar, Transit and GPS Data", "UbiComp 2009, Sep. 30-Oct. 3, Orlando, FL", Sep. 30, 2009, Publisher: ACM, Published in: US.

Heinz, et al., "The Online Target Date Assignment Problem", "WAOA 2005", 2006, pp. 230-243, Publisher: Springer-Verlag Berlin Heidelberg, Published in: DE.

Kong and Fabri, "Optimal Physician Scheduling in a Multi-Clinic Network to Improve Patient Accessibility to Outpatient Care", "Proceedings of the 2009 Industrial Engineering Research Conference", 2009, Published in: US.

Bennett and Erera, "Dynamic periodic fixed appointment scheduling for home health", "IIE Transactions on Healthcare Systems Engineering (2011)", Jan. 2011, pp. 6-19, No. 1, Publisher: IIE, Published in: US.

* cited by examiner

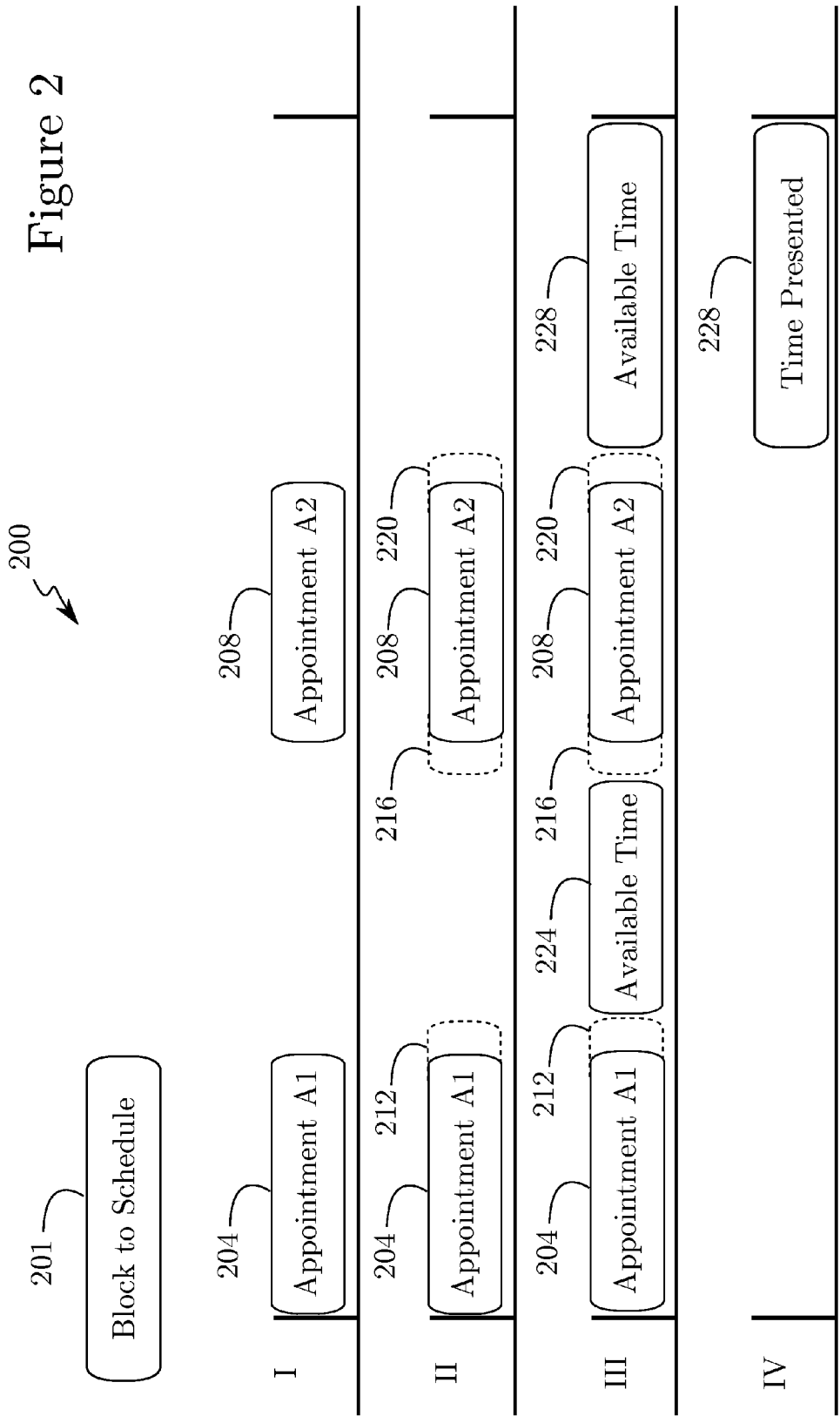

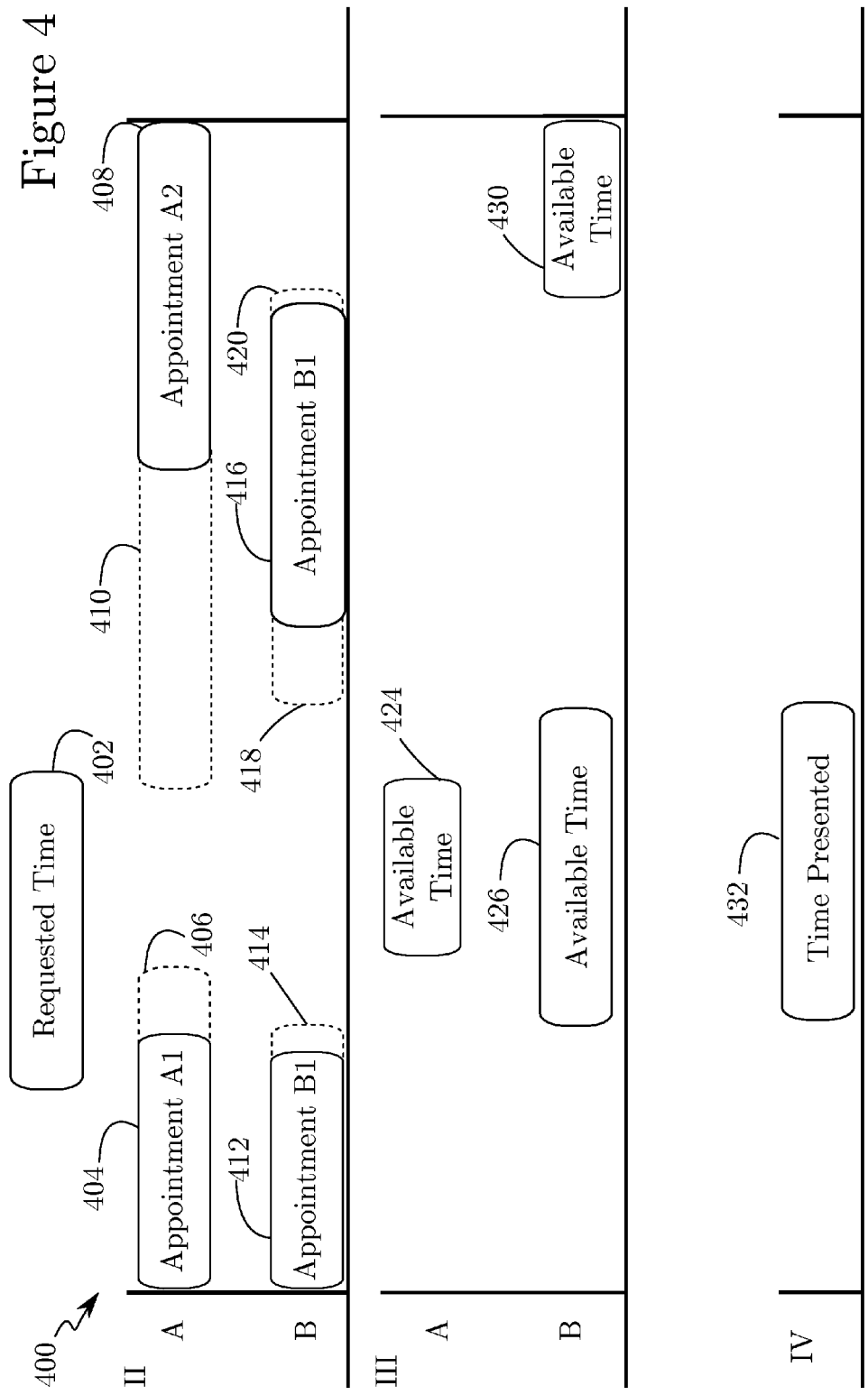

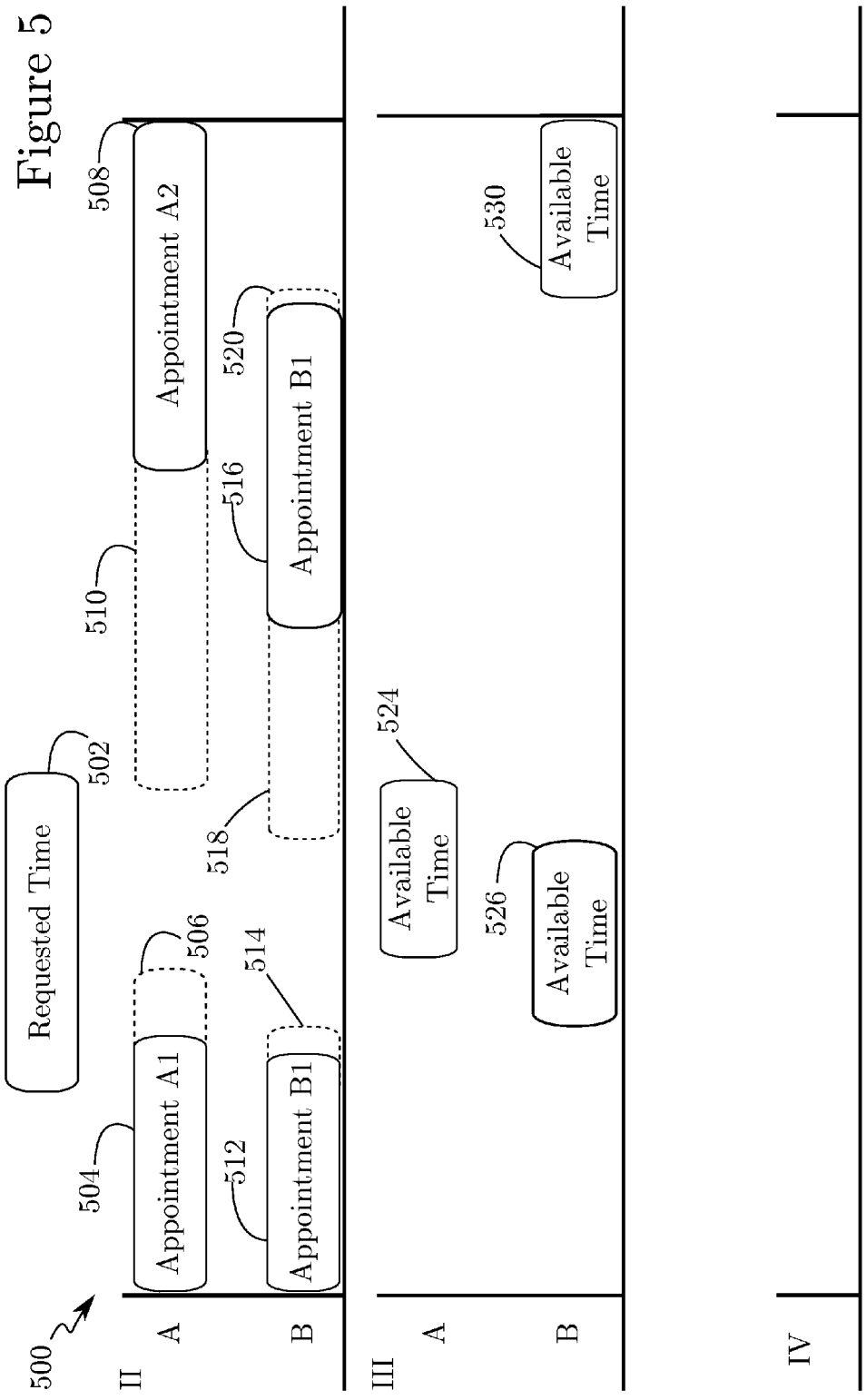

Figure 13A

Available Times on July 4, 2011

○ 10:00 a.m.  ○ 2:15 p.m.
○ 12:00 p.m.  ● 4:30 p.m.
○ 12:15 p.m.  ○ 4:45 p.m.
○ 12:30 p.m.

Book It!   Try Different Date

METHODS, SYSTEMS, AND APPARATUS FOR SCHEDULING APPOINTMENTS

1 REFERENCE TO RELATED APPLICATION

This application claims priority under 35 U.S.C. §119(e) to provisional U.S. Patent Application Ser. No. 61/652,255, filed 28 May 2012, the entire disclosure of which is incorporated in its entirety and for all purposes.

2 NOTICE OF COPYRIGHT

Portions of this patent application include materials that are subject to copyright protection. The copyright owner has no objection to the facsimile reproduction by anyone of the patent document itself, or of the patent application, as it appears in the files of the United States Patent and Trademark Office, but otherwise reserves all copyright rights whatsoever in such included copyrighted materials.

3 BACKGROUND OF THE INVENTION

3.1. Field of the Invention

The present invention provides systems, apparatus, software, and methods for scheduling appointments, and, more particularly, scheduling appointments efficiently for service providers according to the desires and needs of the consumer. The present invention has applications in the fields of business management and computer science.

3.2. The Related Art

Modern economic activity relies heavily on distribution and transport systems to move goods and service providers from one location to another. The days of local same-town service providers and merchants who would deliver goods to their neighbors door-to-door to stay-at-home spouses or live-in relatives have faded into nostalgic memory, replaced today by overnight carriers delivering goods from central distribution centers tens, even hundreds, of miles away, and service providers who must travel thousands of miles yearly to provide their services at various household and business addresses for two-wage-earner households.

Meeting the demands of scheduling thousands of customers over such large distances and extensive circuits traveled by service providers and delivery vehicles is not a simple task. Now that delivery routes are no longer local, accommodating the demands of customers over hundreds or thousands of square miles of territory efficiently and reliably is a major undertaking for both large corporations and small businesses alike. The problems of operating such routes are further complicated by the highly mobile nature of the customers as well. Since many homes are run by two workers, finding times when both the customer and provider can meet is increasingly difficult and must be arranged between the customer and provider; in short, the customer generally must accept the particular agent and time most convenient to the service provider. Moreover, as systems have become more automated and profit margins tighter, customer choice for specific service providers has suffered.

Many efforts have been made to address these challenges, but no solution has addressed all of the difficulties noted above. U.S. Pat. No. 7,487,105 to Jacobs discloses a method for assigning an order to an opening in a schedule after a customer has selected an appointment window in the schedule. According to the Jacobs system, a customer interested in having a service performed by a service organization calls the organization to make a reservation for the desired service. In order to identify openings in the service organization's existing schedule, the Jacobs method involves iterating through generated virtual free time blocks, which are blocks of free time between the end of the work on one (scheduled) order and the start of travel to another (scheduled) order. The Jacobs system also involves maximizing the free time blocks within a shift by "bumping" one or more contiguous orders within a shift. Thus, the Jacobs method does not have the ability to accept an order without the customer calling the service organization, and the identification of free time blocks is limited in circumstances where customer orders are scheduled for a specific time and cannot be bumped. Moreover, while the Jacobs method identifies free time blocks for the requested orders based on travel time between existing orders, this travel time does not account for the location of the requested order.

U.S. Patent Publication No. 2008/0306791 to Rubertone describes a Web-based software application and scheduling method for scheduling service provider appointments with "leads", i.e., customers who respond, usually by telephone, to an advertisement from the service provider. The locations of appointments are recorded such that a schedule with both locations and drive times between locations is provided to an "appointment setter" who assigns locations and appointment times to individual service providers. The systems and methods described by Rubertone allow only for manual selection and "optimization" of schedules. Thus, the Rubertone method does not provide the ability to accept an order without the customer calling the service organization, the identification of free time blocks is limited in circumstances where customer orders are scheduled for a specific time and cannot be bumped, and the scheduling is done manually.

U.S. Patent Publication No. 2011/00777860 to Coughlin, et al., describes techniques for providing a meeting notification and automatic modification service. The techniques include system configured to identify an appointment in a calendar application, identify a geographic location of the appointment, and identify, before the appointment time, a geographic location of a first participant of the appointment. Based on the geographic information, the system may identify a route extending from the geographic location of the first participant to the geographic location of the appointment, and may identify a travel time associated with the route. Based on the travel time and the appointment time, the system may determine whether the first participant is estimated to arrive at the appointment on time and, based on the determination, the system may send a message to participants of the appointment or dynamically reschedule the appointment. Coughlin, et al., do not describe a customer scheduling system in which the customer schedules an appointment for a service call, nor do Coughlin, et al., describe optimizing travel schedules for service providers or offering a customer choices for the arrival of service providers.

U.S. Patent Publication No. 2010/0293029 to Olliphant describes a system for arranging meetings between an organizer or initiator and one or more other participants (invitees). The system provides for automating the scheduling of periodic meetings and other types of social occasions, or any other periodic activities. The periodic meetings can be arranged between the user and parties unknown to the user based on common interests that are discovered by the system. In some embodiments, in order to more fully automate the scheduling of these meetings, the system described by Olliphant accounts for factors such as participant availability, participant travel preferences, location preferences, and how meeting frequency. Like Coughlin, et al., Olliphant does not describe a customer scheduling system in which the customer schedules an appointment for a service call, or optimizing travel schedules for service providers or offering a customer choices for the arrival of service providers.

U.S. Patent Publication No. 2008/0114638 to Colliau, et al., describes a system for scheduling appointments for service calls, especially those related to inspections for home purchases. The system calculates a total time for performing the task in accordance with user-provided information, and generates a list of available service providers. The list is determined in accordance with the total time for performing the task, schedules of service providers, and a time window specified by the user. The system presents scheduling options for the user, and schedules the appointment selected by the user. Colliau, et al., describe determining scheduling options by adjusting routes of providers according to geography and task time, and "backfilling" appointments of one provider by other providers in order to generate appointment options. However, Colliau, et al., do not describe adjusting the schedule of any one provider to enable that particular provider to accommodate an appointment request.

Thus, current systems and methods for scheduling services still lack important features and capabilities. In particular, these systems do not accommodate sufficiently the particular needs and desires of customers. The present invention meets these and other needs.

4 SUMMARY OF EMBODIMENTS OF THE INVENTION

The present invention overcomes the above-described limitations of the prior art to provide a useful and flexible scheduling method, system, and apparatus.

In a first aspect, the present invention provides methods for scheduling an appointment between a first party and a second party. In one embodiment, the method of the invention is implemented at least in part by one or more processing devices, comprising: receiving a requested appointment from the first party, the requested appointment including an requested appointment location and information defining at least one period of time; storing the requested appointment; executing computer processor instructions to identify at least one current appointment for the second party during the at least one period of time, and a location for at least one of the at least one current appointment; executing computer processor instructions to determine an interval of time between at least one of the at least one current appointment and the requested appointment based at least in part on the location of the at least one current appointment and the requested appointment location; executing computer processor instructions to determine at least one available time option for scheduling the requested appointment based at least in part on the interval of time; and returning the at least one available time option to the first party.

In a more specific embodiment, each of the current appointments has an associated block of reserved time, and further comprising determining under computer control at least one block of unavailable time associated with each of the current appointments by appending and prepending the travel time to the associated block of reserved time for each of the current appointments.

In a more specific embodiment, the method of the invention further comprises determining under computer control a new appointment block of time determined by the new appointment desired start time and the new appointment desired end time, and removing the at least one block of unavailable time from the new appointment block of time. In a still more specific embodiment, the invention further comprises receiving a new appointment confirmation from the first party; and in yet more specific embodiments, the method of the invention further comprises creating a confirmed new appointment corresponding to the new appointment confirmation.

In a second embodiment the invention provides a computer-implemented method for scheduling an appointment between a first party and a second party, comprising: sending under computer control a new appointment request from the first party, the new appointment request including a new appointment location, a new appointment desired start time, and a new appointment desired end time; and receiving under computer control at least one available time option for scheduling the new appointment request. The at least one available time option is determined by a computer-controlled process including: identifying under computer control all current appointments for the attendee between the new appointment desired start time and the new appointment desired end time, and the locations of the current appointments; determining under computer control a path and a travel time from each of the current appointments to the new appointment location; and determining under computer control the at least one available time option for the new appointment request based at least in part on the interval of time.

In a more specific embodiment, each of the current appointments has an associated block of reserved time, and further comprising determining under computer control at least one block of unavailable time associated with each of the current appointments by appending and prepending the travel time to the associated block of reserved time for each of the current appointments.

In a more specific embodiment, the method of the invention further comprises determining under computer control a new appointment block of time determined by the new appointment desired start time and the new appointment desired end time, and removing the at least one block of unavailable time from the new appointment block of time. In a still more specific embodiment, the invention further comprises receiving a new appointment confirmation from the first party; and in yet more specific embodiments, the method of the invention further comprises creating a confirmed new appointment corresponding to the new appointment confirmation.

In as second aspect, the present invention provides a non-transitory computer-readable medium containing a computer program product, the computer program product being configured to enable a computer to schedule an appointment between a first party and a second party at least in part by one or more processing devices, the computer program product comprising: data and instructions configured to enable the computer to receive a requested appointment from the first party, the requested appointment including an requested appointment location and information defining at least one period of time; data and instructions configured to enable the computer to store the requested appointment; data and instructions configured to enable the computer to identify at least one current appointment for the second party during the at least one period of time, and a location for at least one of the at least one current appointment; data and instructions configured to enable the computer to determine an interval of time between at least one of the at least one current appointment and the requested appointment based at least in part on the location of the at least one current appointment and the requested appointment location; data and instructions configured to enable the computer to determine at least one available time option for scheduling the requested appointment based at least in part on the interval of time; and data and instructions configured to enable the computer to return the at least one available time option to the first party.

In a more specific embodiment, each of the current appointments has an associated block of reserved time, and said data and instructions are further configured to enable the computer to determine at least one block of unavailable time associated with each of the current appointments by appending and prepending the travel time to the associated block of reserved time for each of the current appointments.

In a more specific embodiment, the medium of the invention further comprises data and instructions configured to enable a computer to determine a new appointment block of time determined by the new appointment desired start time and the new appointment desired end time, and removing the at least one block of unavailable time from the new appointment block of time. In a still more specific embodiment, the medium of the invention further comprises data and instructions configured to enable a computer to receive a new appointment confirmation from the first party; and in yet more specific embodiments, the medium of the invention further comprises data and instructions configure to enable a computer to create a confirmed new appointment corresponding to the new appointment confirmation.

In a third aspect, the present invention provides a computer system for scheduling an appointment between a first party and a second party, the system being implemented at least in part by one or more processing devices and comprising: a computer-controlled receiver configured to receive a requested appointment from the first party, the requested appointment including an requested appointment location and information defining at least one period of time; a computer-implemented data store configure to store the requested appointment; a computer processor configured to execute computer processor instructions to identify at least one current appointment for the second party during the at least one period of time, and a location for at least one of the at least one current appointment; a computer processor configured to execute computer processor instructions to determine an interval of time between at least one of the at least one current appointment and the requested appointment based at least in part on the location of the at least one current appointment and the requested appointment location; a computer processor configured to execute computer processor instructions to determine at least one available time option for scheduling the requested appointment based at least in part on the interval of time; and a computer-controlled responder configured to returning the at least one available time option to the first party.

In one embodiment, each of the current appointments has an associated block of reserved time, and the computer system further comprises a computer processor configured to determine under computer control at least one block of unavailable time associated with each of the current appointments by appending and prepending the travel time to the associated block of reserved time for each of the current appointments. In a more specific embodiment, the computer system further comprising a computer processor configured to determine under computer control a new appointment block of time determined by the new appointment desired start time and the new appointment desired end time, and removing the at least one block of unavailable time from the new appointment block of time. In a still more specific embodiment, the computer system further comprising a computer controlled received configured to receive a new appointment confirmation from the first party.

These and still more embodiments, features, and advantages of the present invention will become apparent when the following disclosure is read in conjunction with the accompanying drawings.

5 BRIEF DESCRIPTION OF THE DRAWINGS

Exemplary embodiments of the present invention are described herein with reference to the following drawings, in which:

FIG. 2 is an illustration of the determination of available time for scheduling an appointment according to one embodiment of the invention.

Figure 3A:
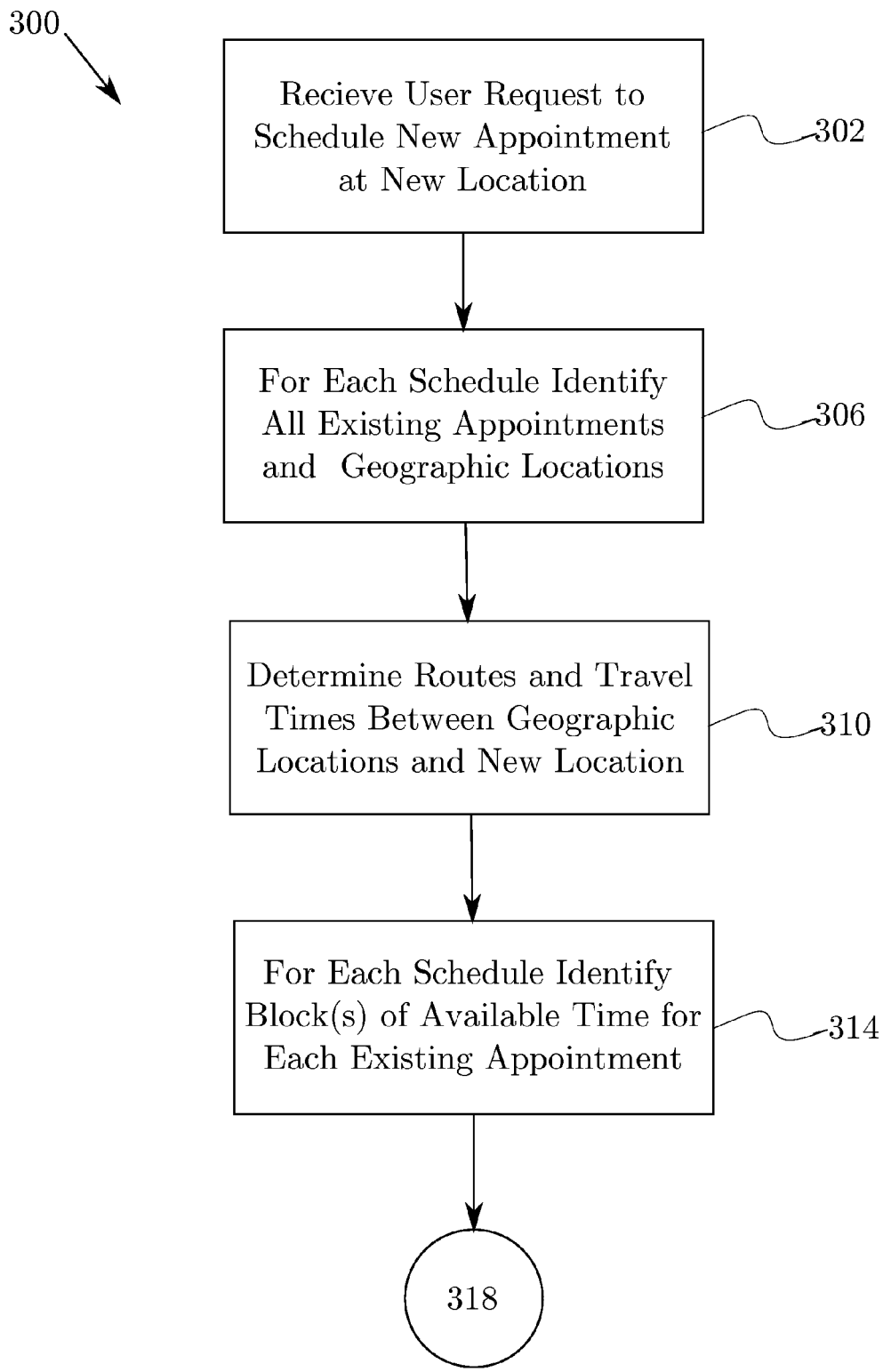
Figure 3B:
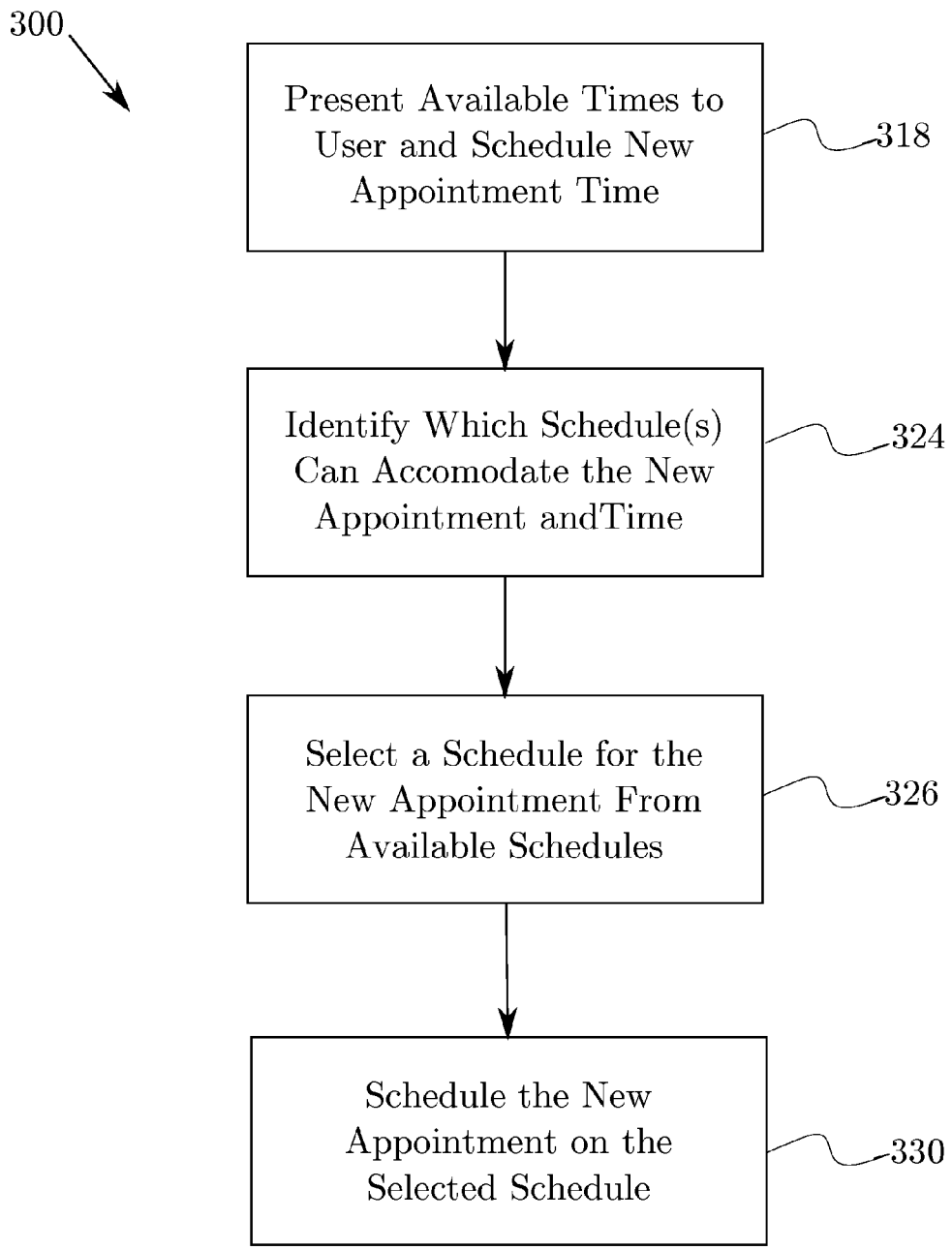

FIGS. 3A and 3B are flowcharts illustrating an embodiment of the invention. FIG. 3A illustrates a first portion of the illustrated embodiment; FIG. 3B illustrates a second portion of the illustrated embodiment.

FIG. 4 is an illustration of the determination of available time for scheduling an appointment according to one embodiment of the invention.

FIG. 5 is an illustration of the determination of available time for scheduling an appointment according to one embodiment of the invention.

Figure 6A:
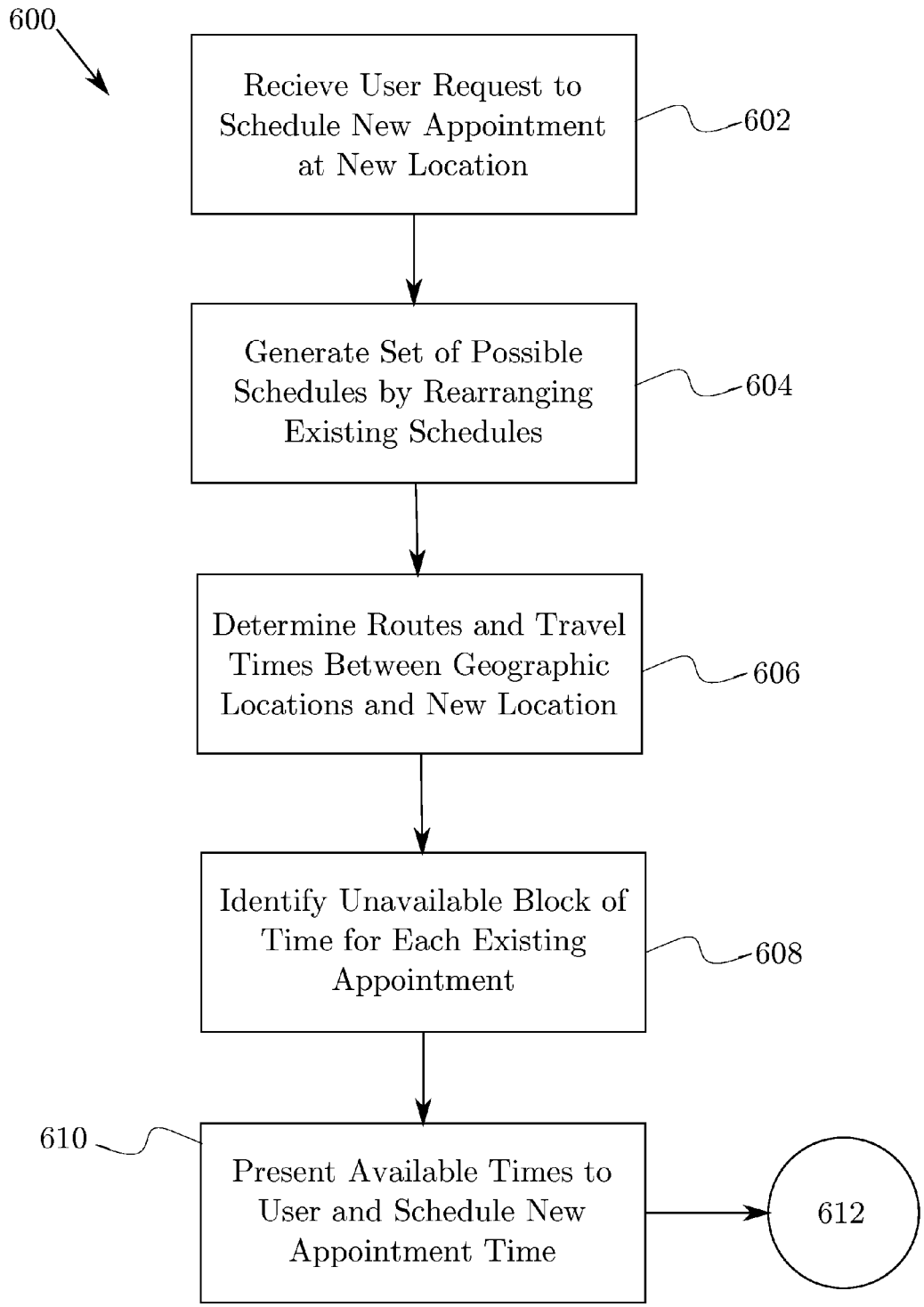
Figure 6B:
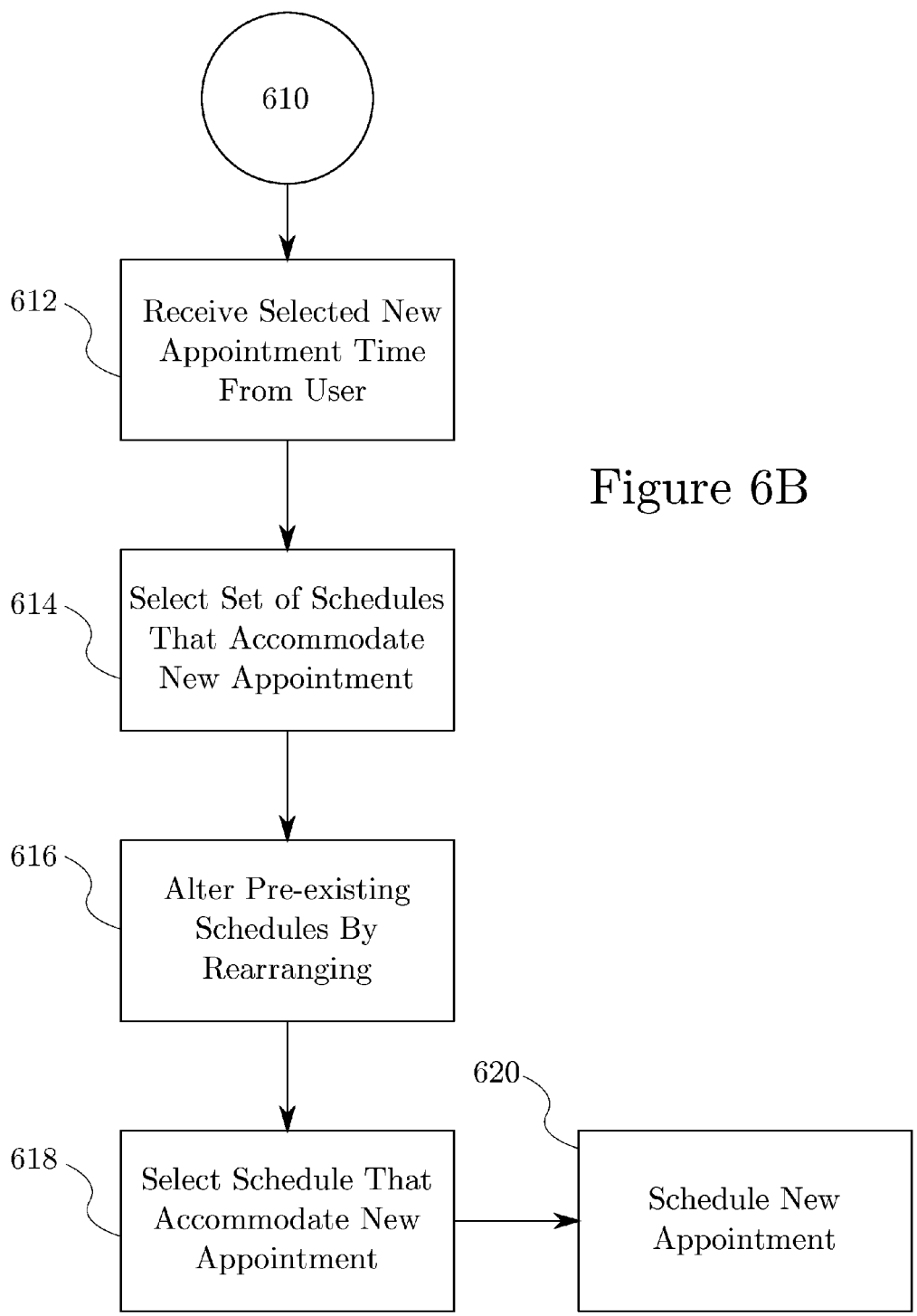

FIGS. 6A and 6B are flowcharts illustrating an embodiment of the invention. FIG. 6A illustrates a first portion of the illustrated embodiment; FIG. 6B illustrates a second portion of the illustrated embodiment.

Figure 7A:
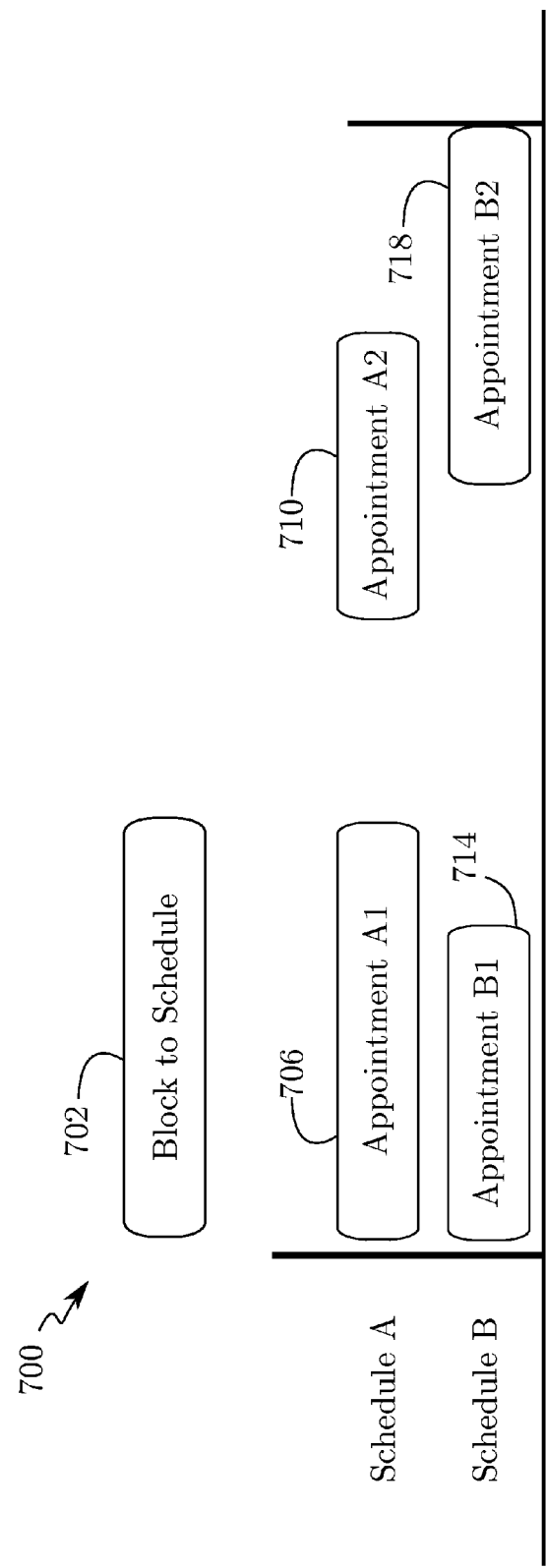
Figure 7B:
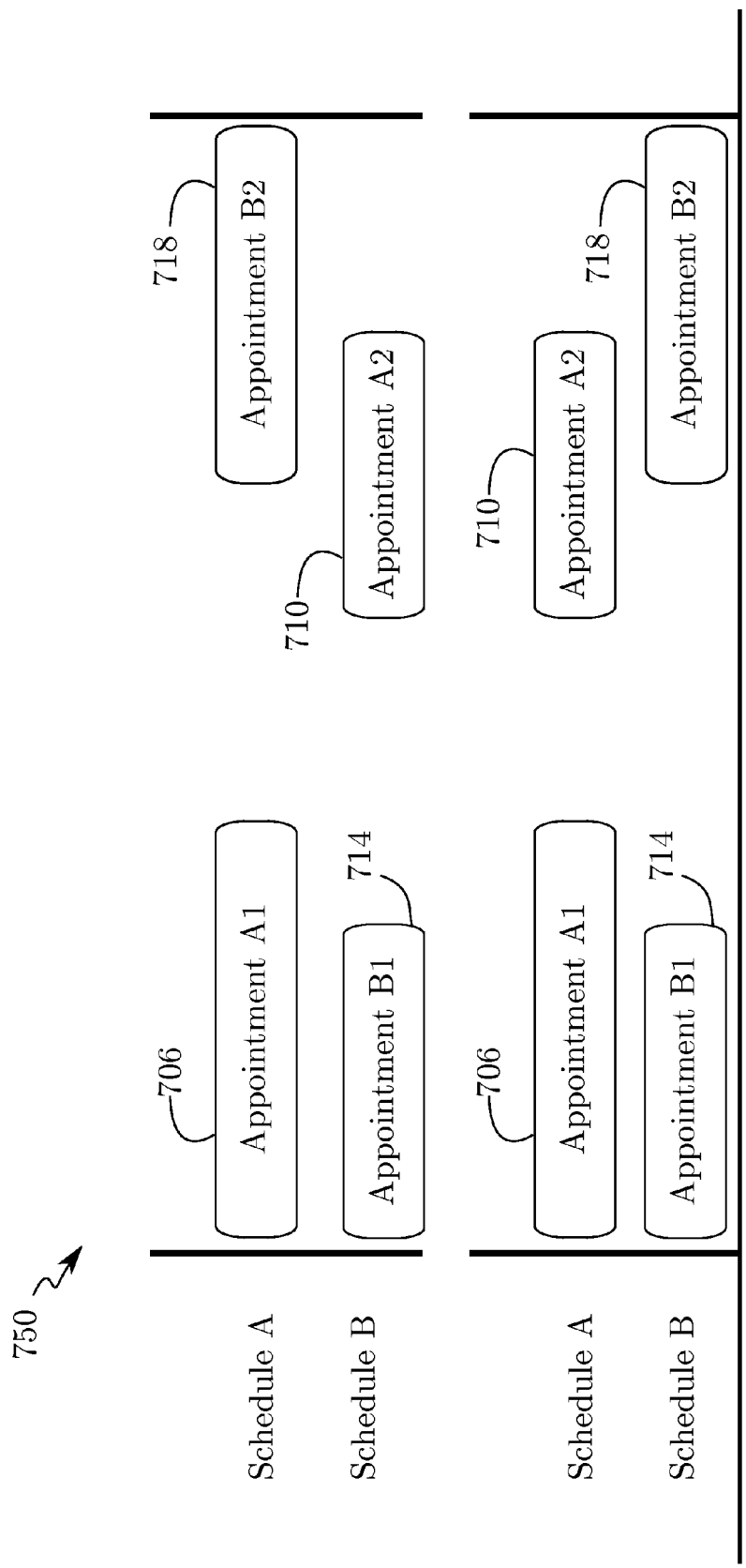
Figure 7C:
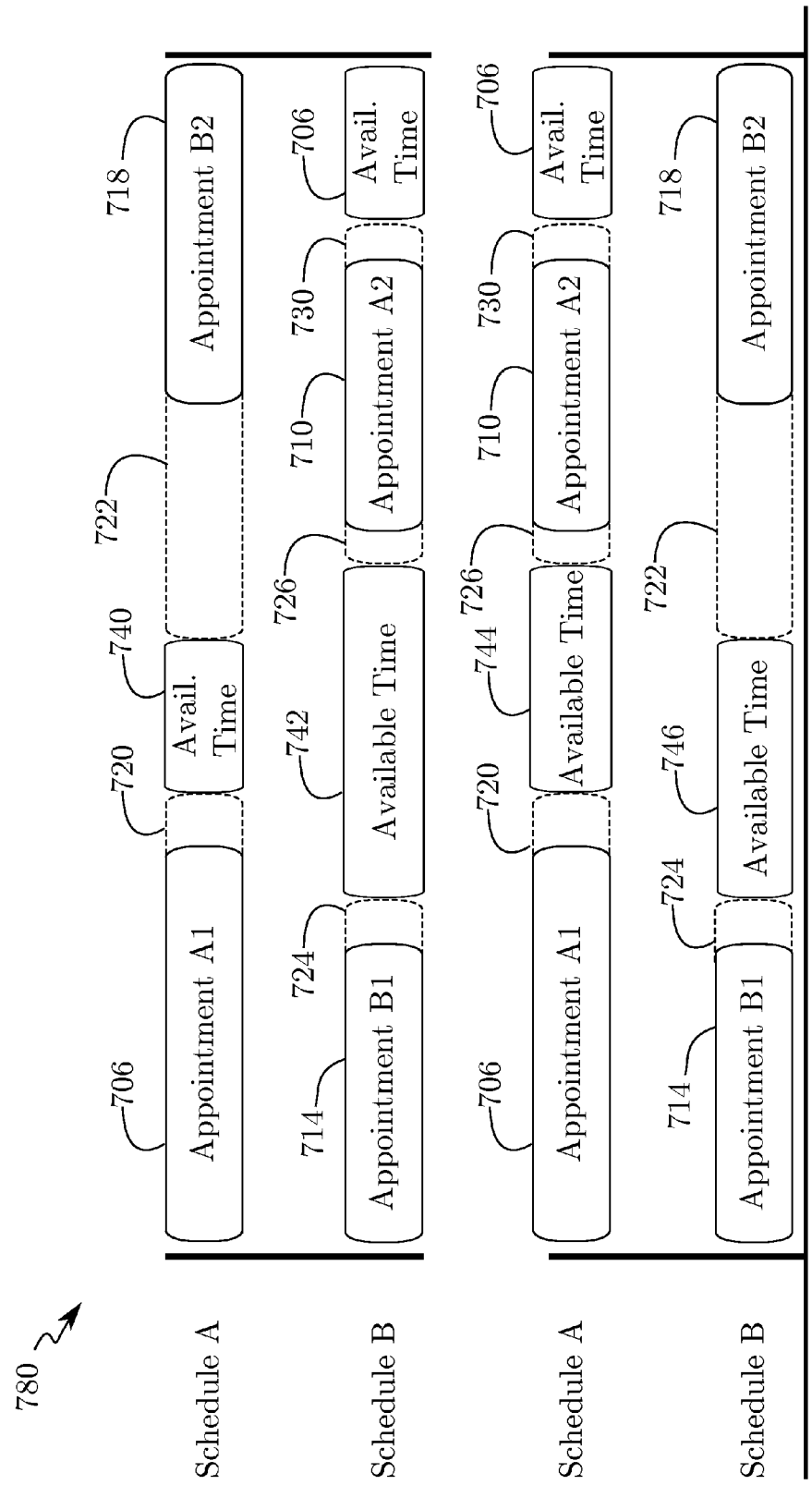

FIGS. 7A, 7B, and 7C are illustrations of the determination of available time for scheduling an appointment according to one embodiment of the invention.

Figure 8A:
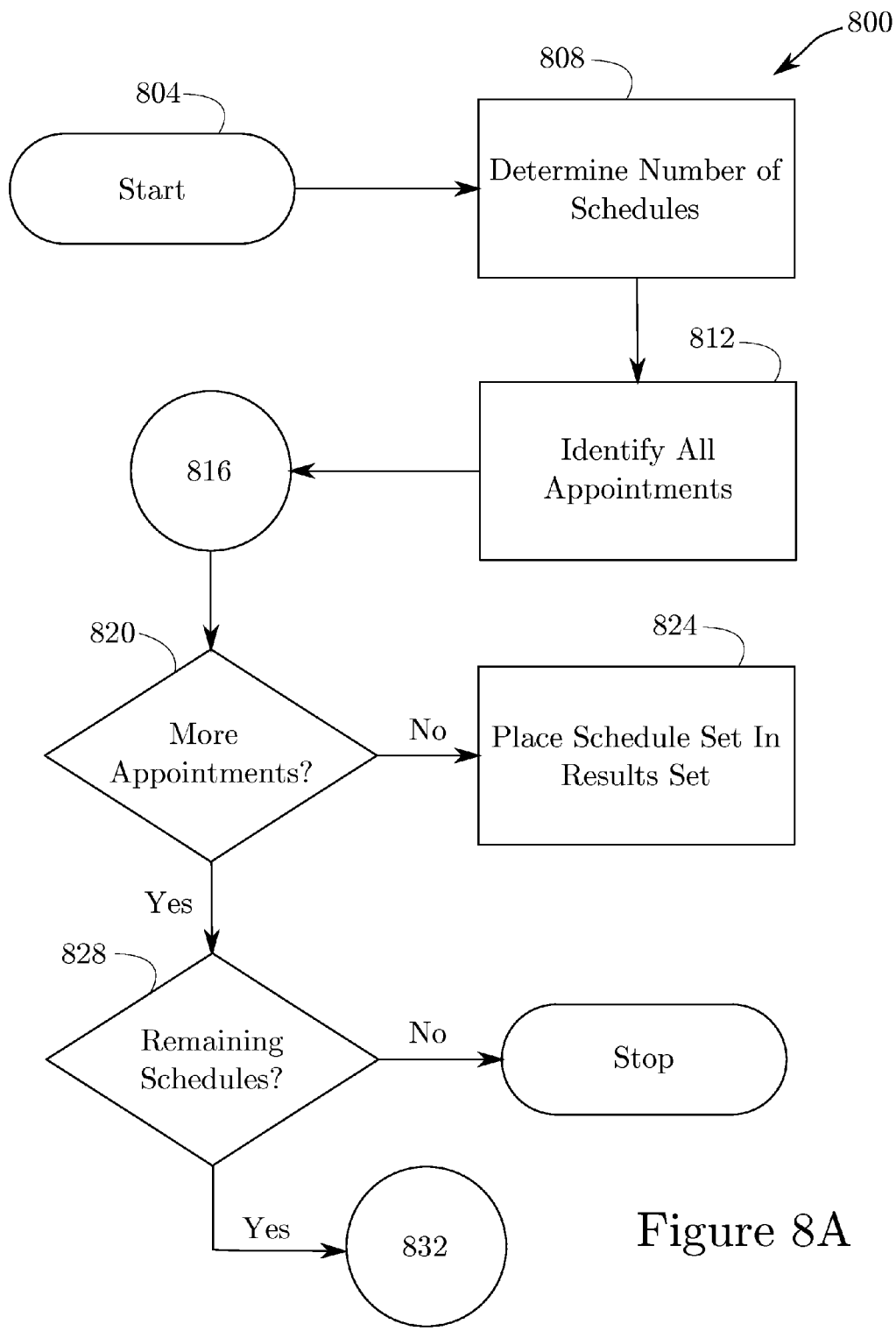
Figure 8B:
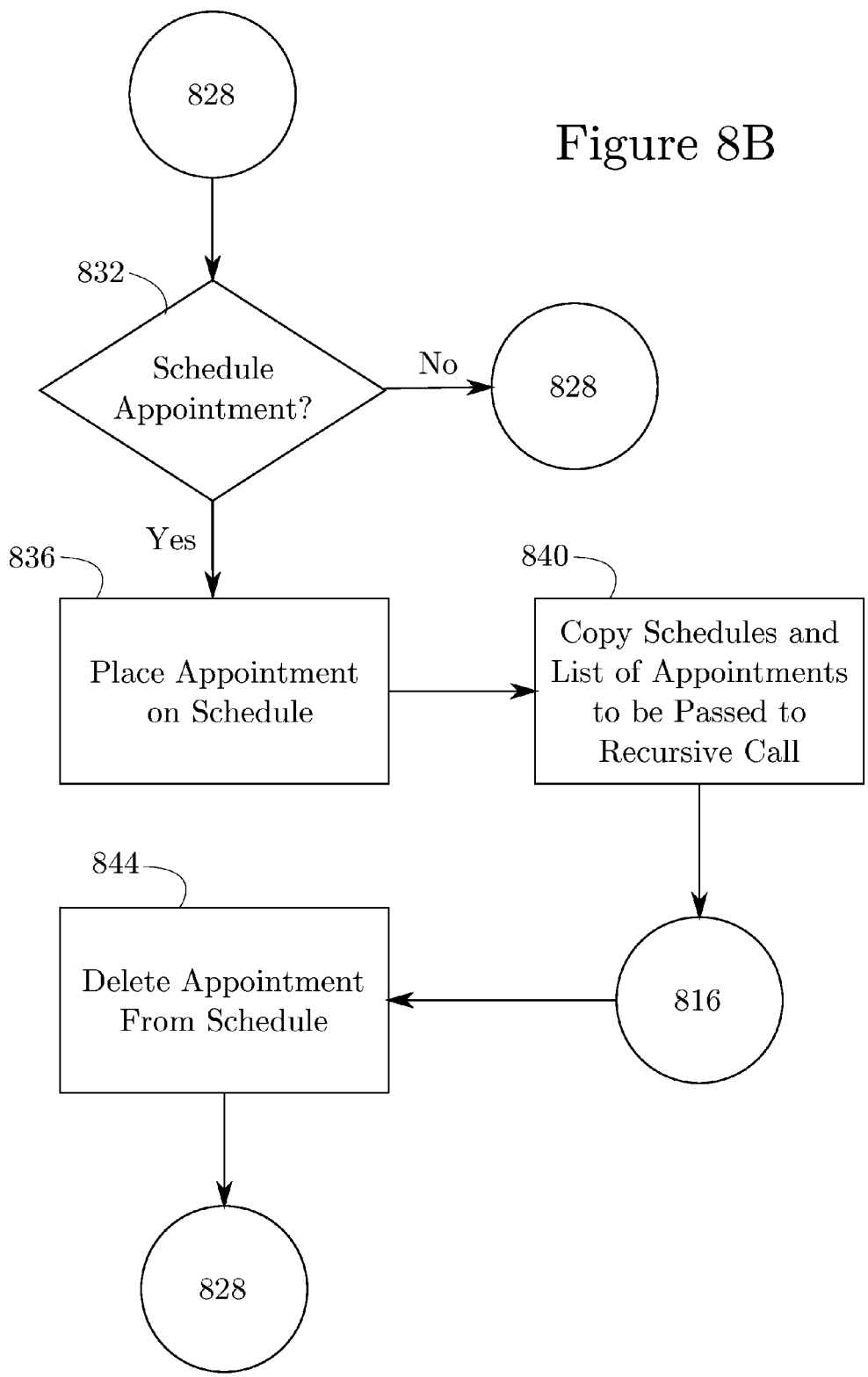

FIGS. 8A and 8B are flowcharts illustrating an embodiment of the invention. FIG. 8A illustrates a first portion of the illustrated embodiment; FIG. 8B illustrates a second portion of the illustrated embodiment.

FIGS. 9A, 9B, 9C, 9D, 9E, 9F, 9G, and 9H are illustrations of the determination of available time for scheduling an appointment according to one embodiment of the invention.

Figure 10A:
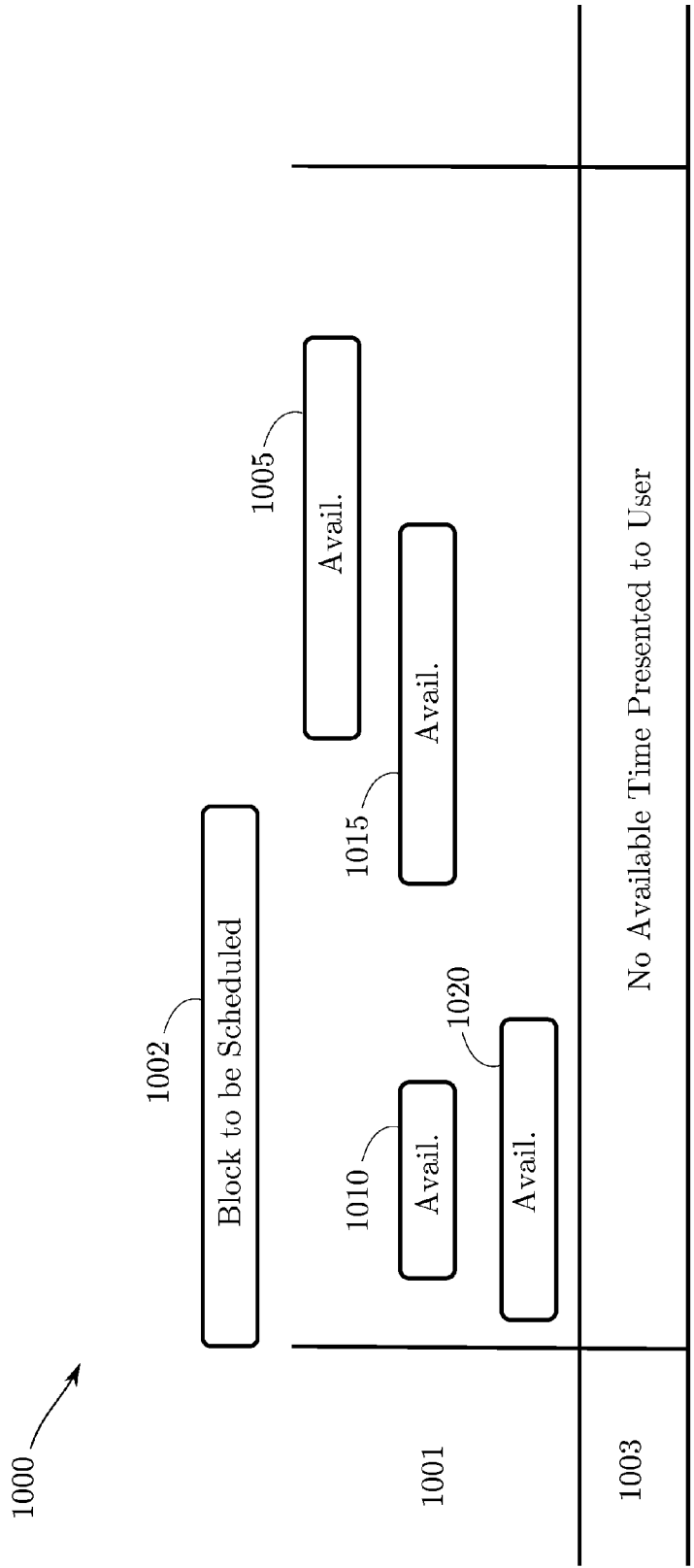
Figure 10B:
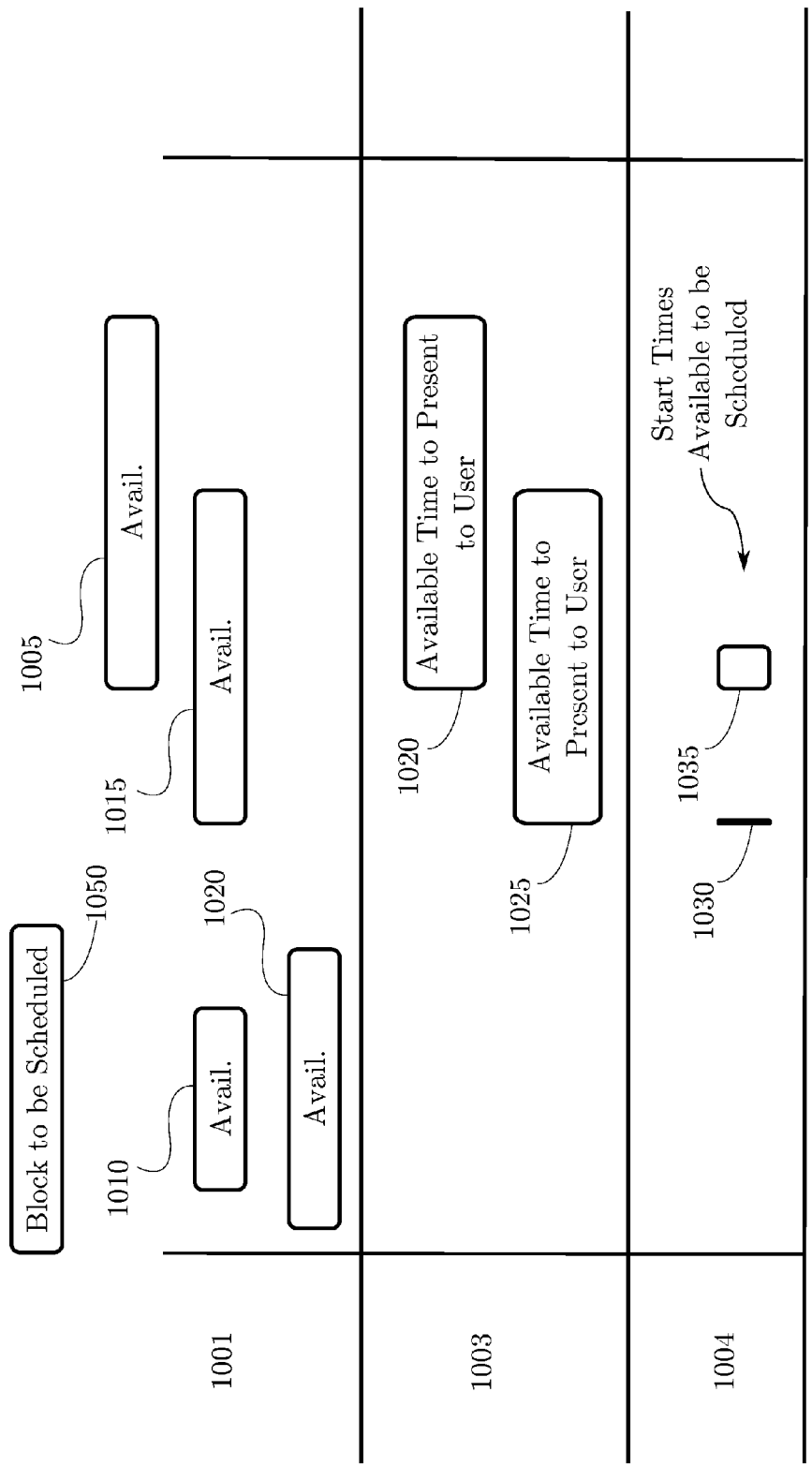
Figure 10C:
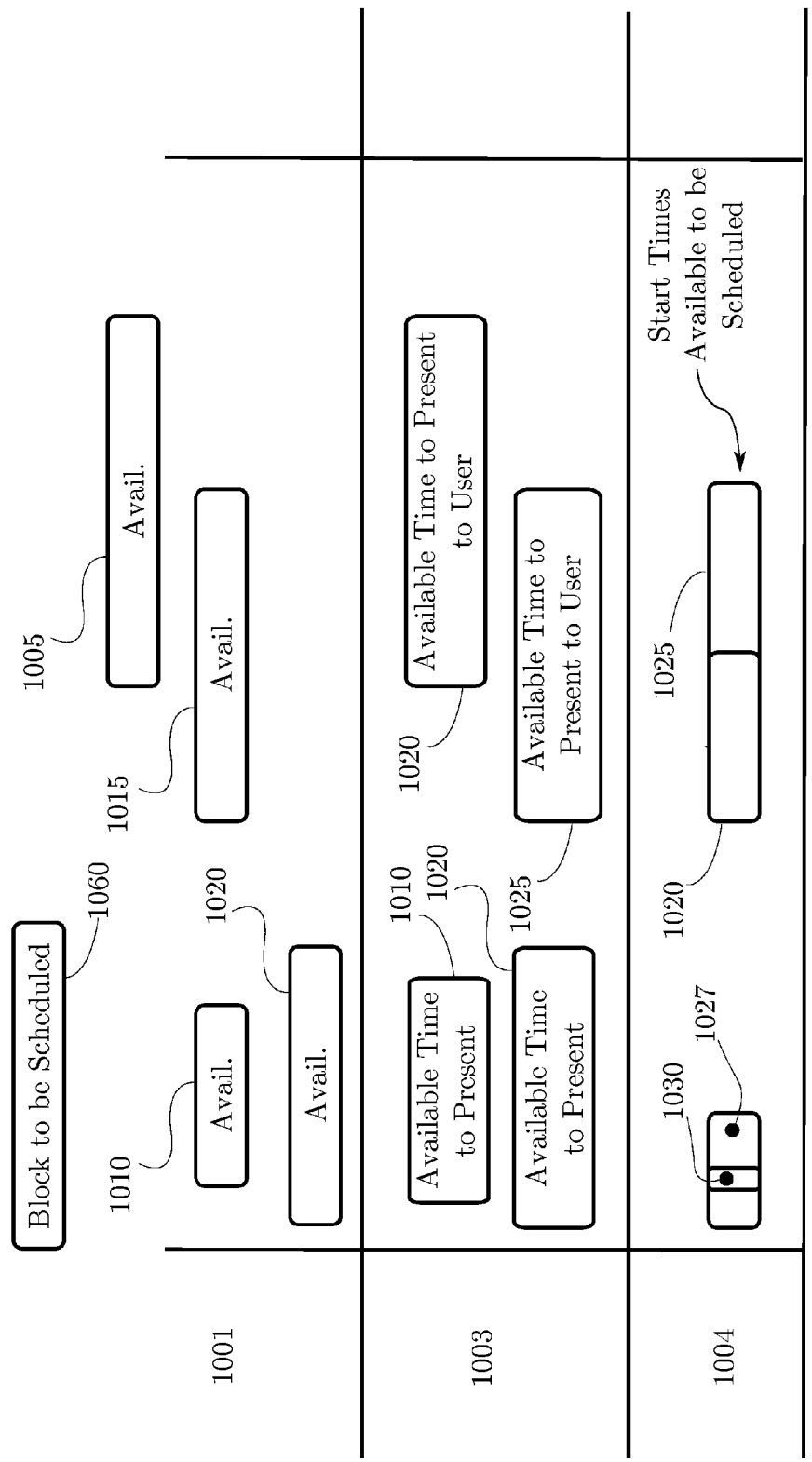

FIGS. 10A, 10B, and 10C are illustrations of the determination of available time for scheduling an appointment according to one embodiment of the invention.

Figure 11A:
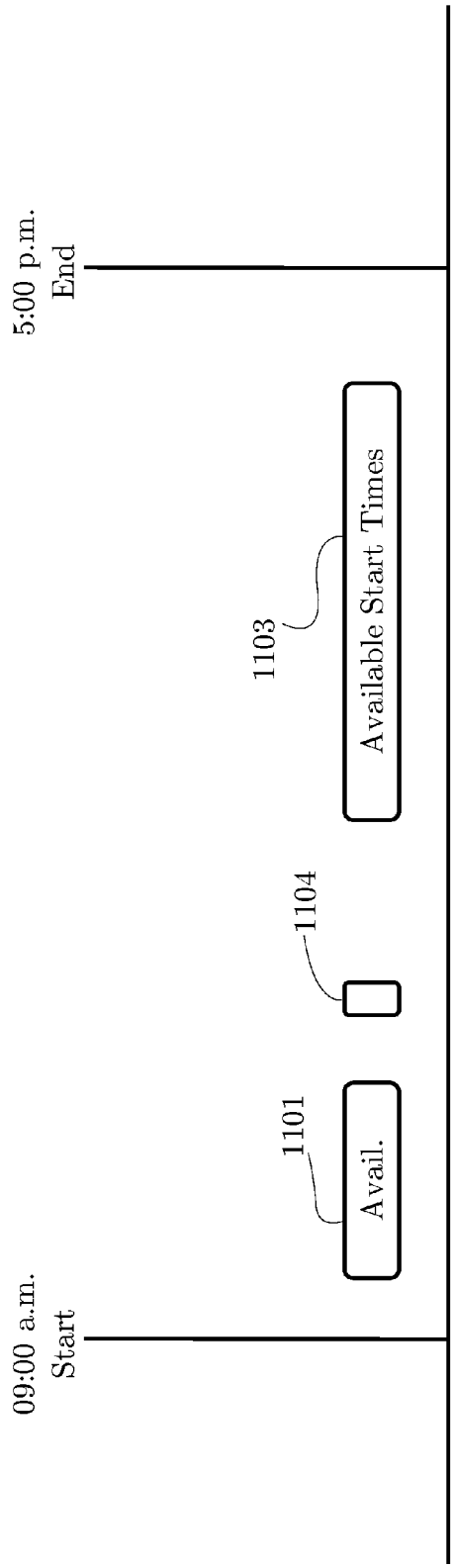
Figure 11B:
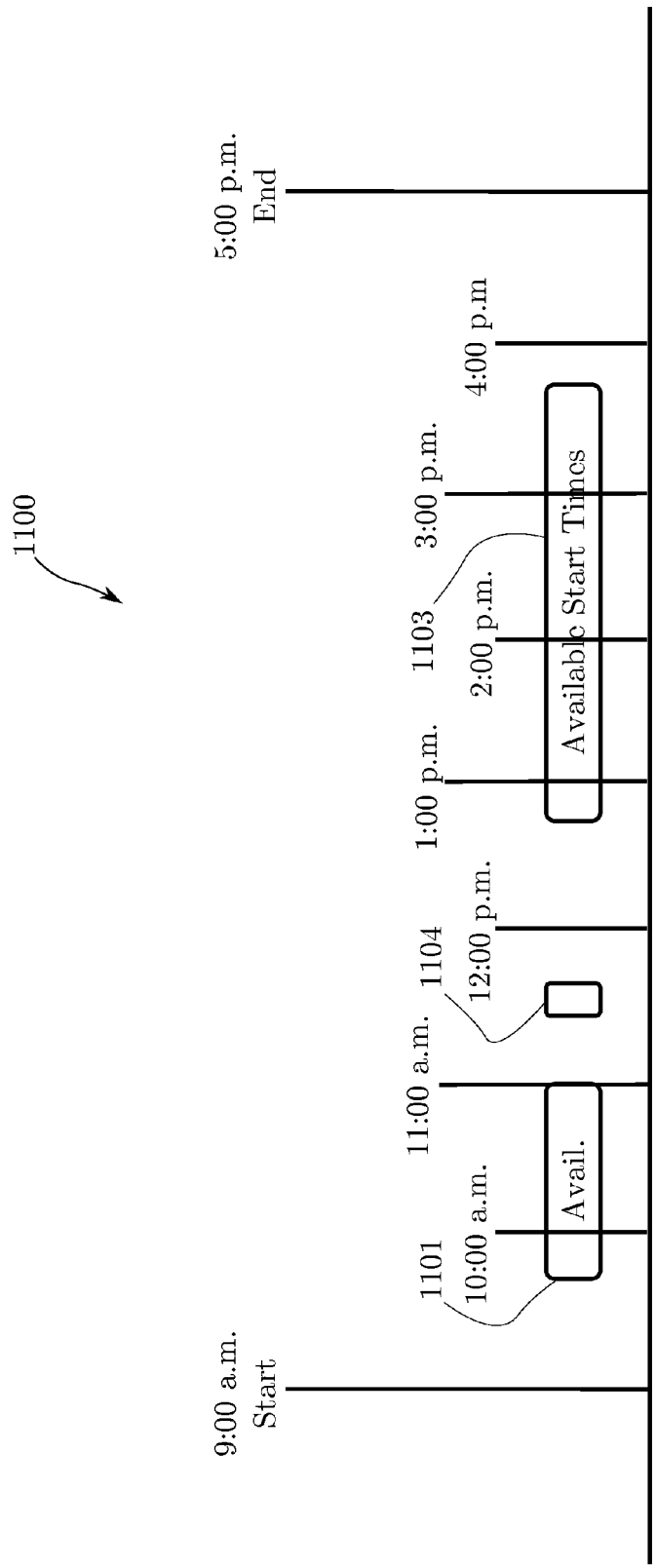
Figure 11C:
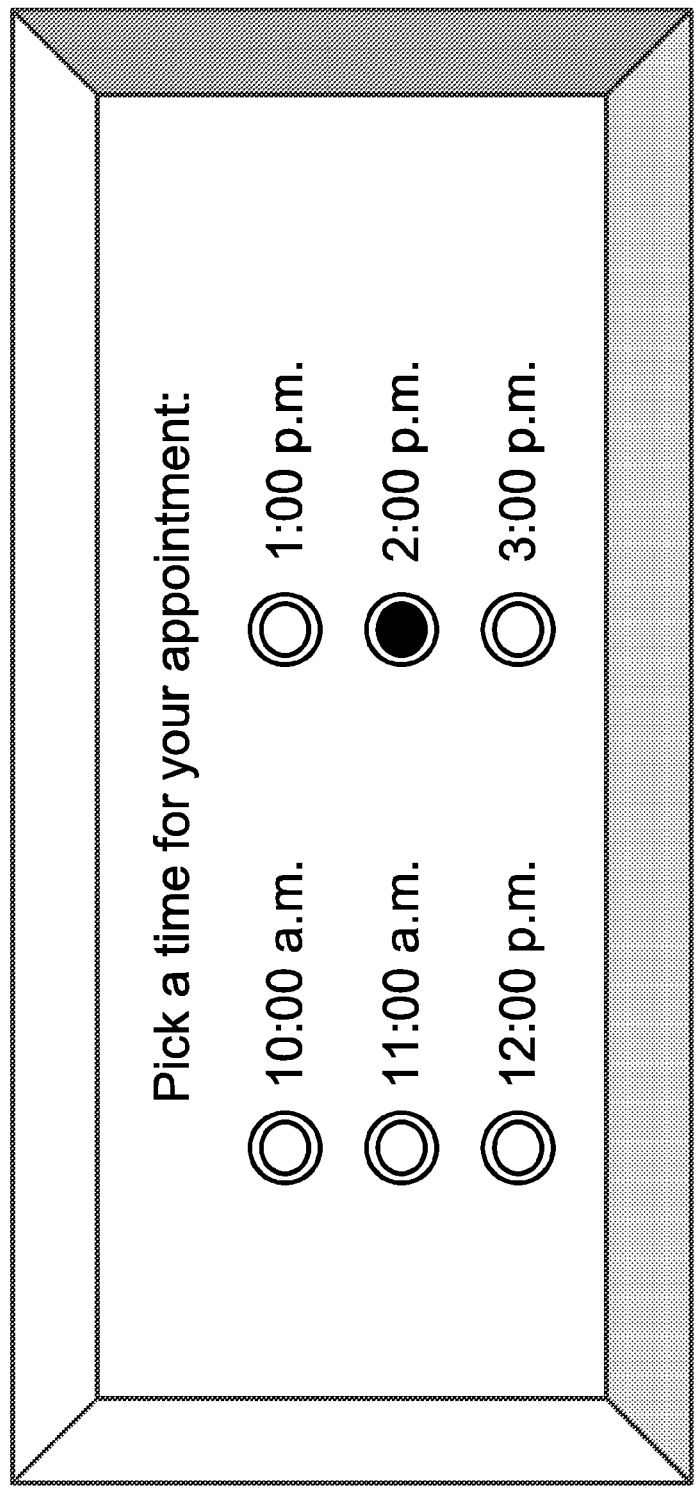

FIGS. 11A and 11B are illustrations of the determination of available time for scheduling an appointment according to one embodiment of the invention. FIG. 11C illustrates one embodiment for a user interface configured to enable a user to enter a choice of appointment time according to an embodiment of the invention.

Figure 12:
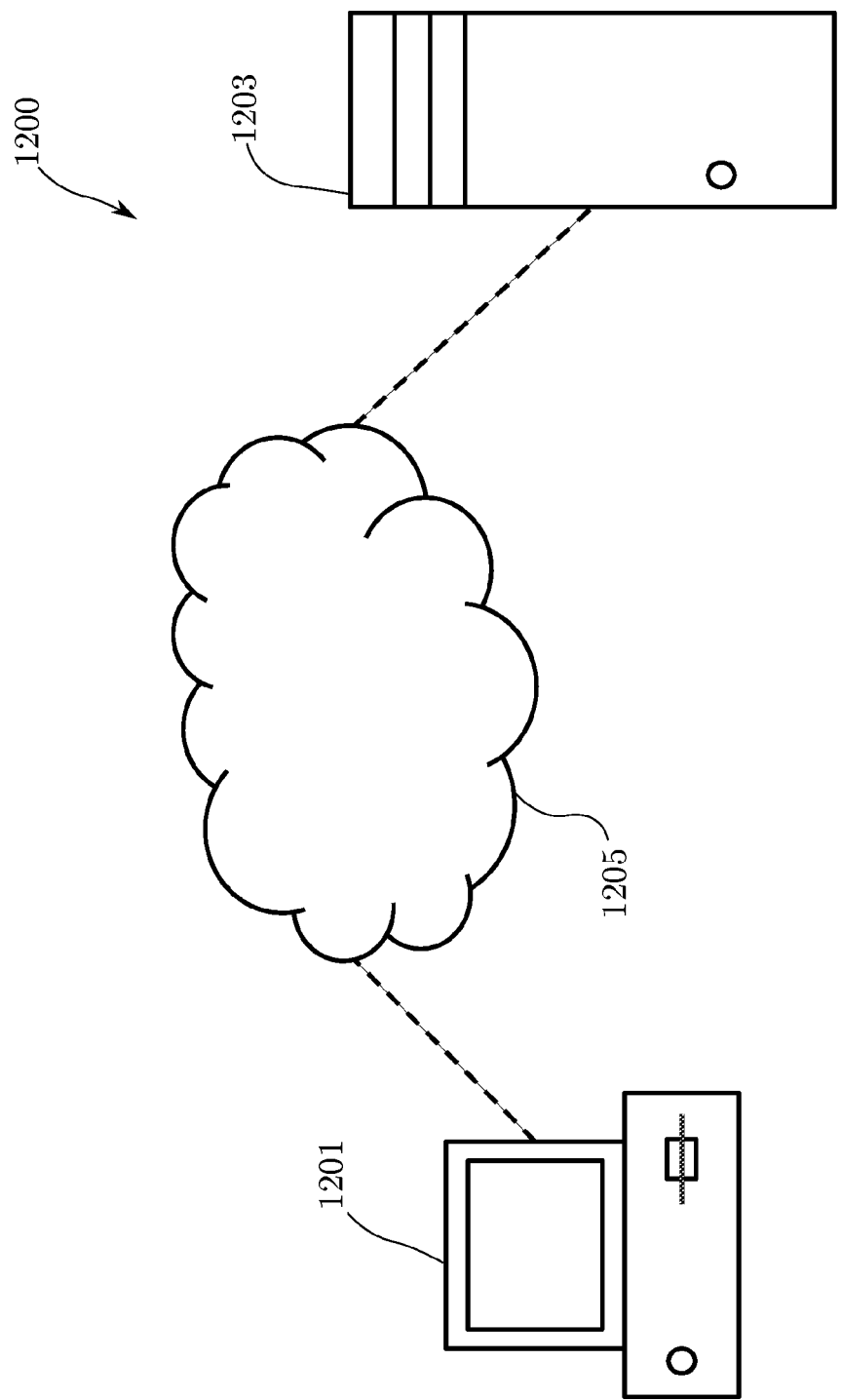

FIG. 12 is a schematic illustration of a computer system in accordance with one embodiment of the invention.

Figure 13A:
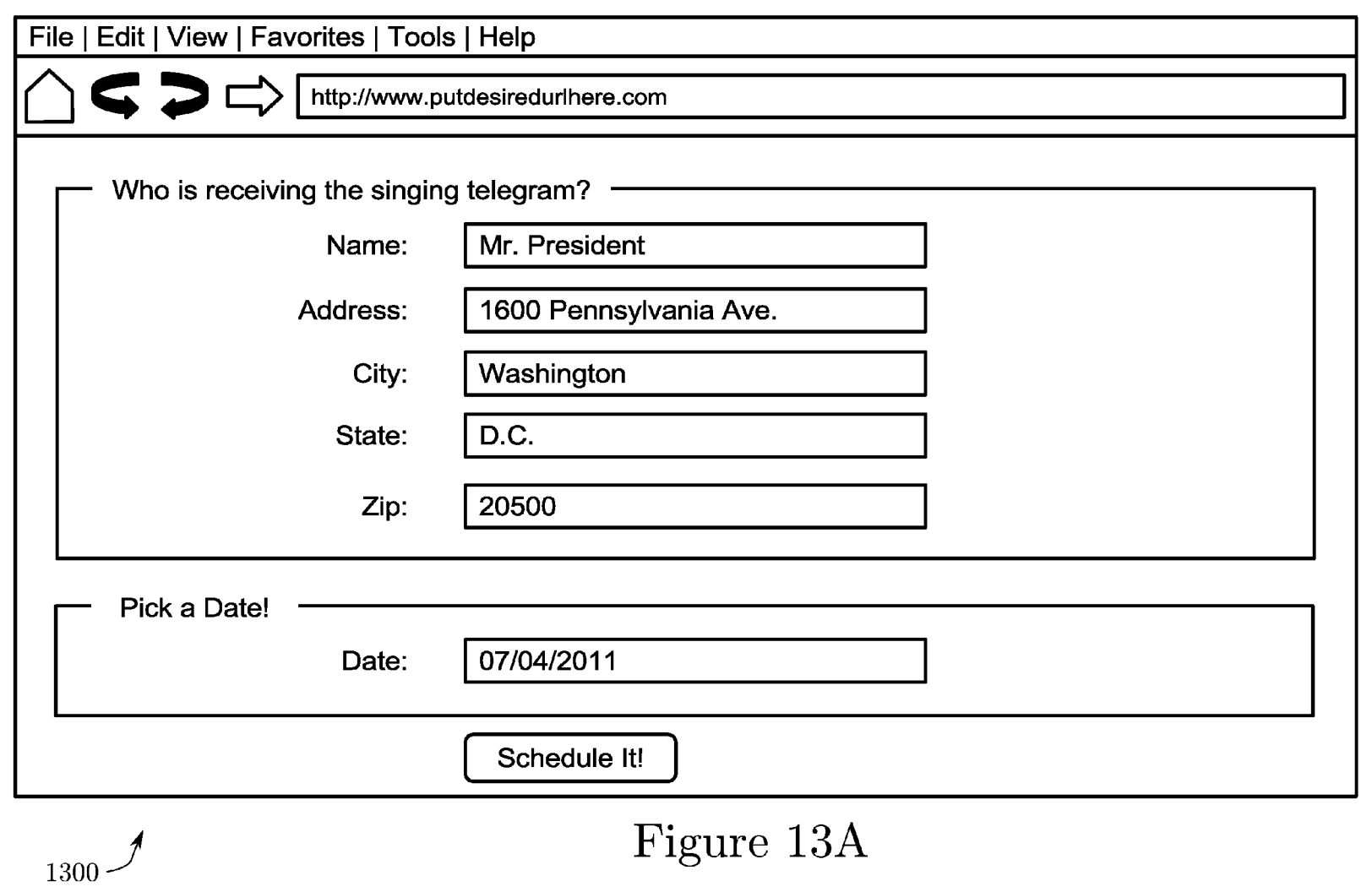

FIGS. 13A and 13B illustrate aspects of a user interface in accordance with one embodiment of the invention. FIG. 13A illustrates an interface for enabling a user to provide information to request an appointment in accordance with one embodiment of the present invention. FIG. 13B illustrates an interface for enabling a user to select an appointment from a list of possible appointments determined in accordance with the invention.

6 DETAILED DESCRIPTION OF SOME EMBODIMENTS OF THE INVENTION

The present invention solves the problems discussed above by providing a unique methods and corresponding apparatus and systems that efficiently accommodate, if possible, the schedules of both users (i.e., any party that seeks to schedule a service or delivery or the like from a provider) and providers (i.e., any party that provides services, goods, or the like to users). As will become apparent to those having ordinary skill in the art from the text and drawing herein, the present invention can be applied to a myriad of applications in which two parties seek to find a common time and location to meet.

6.1 Methods for Scheduling Appointments in Accordance with the Invention

In a first aspect, the present invention provides methods for scheduling an appointment between a first party and a second party. In more specific embodiments, the methods are implemented at least in part by one or more processing devices as described hereinbelow. In some embodiments the methods of the invention comprise receiving a requested appointment from the first party, the requested appointment including an requested appointment location and information defining at least one period of time, and storing the requested appointment. Generally such data will be provided in the form of a data structure of some other representation in the memory of a computer or like device. Computer processor instructions are executed on the data in the memory to identify at least one current appointment for the second party during the at least one period of time, and a location for at least one of the at least one current appointment. Still more computer processor instructions are executed to determine an interval of time between at least one of the at least one current appointment and the requested appointment based at least in part on the location of the at least one current appointment and the requested appointment location, and further to determine at least one available time option for scheduling the requested appointment based at least in part on the interval of time. The at least one available time option is then returned to the first party.

Figure 1:
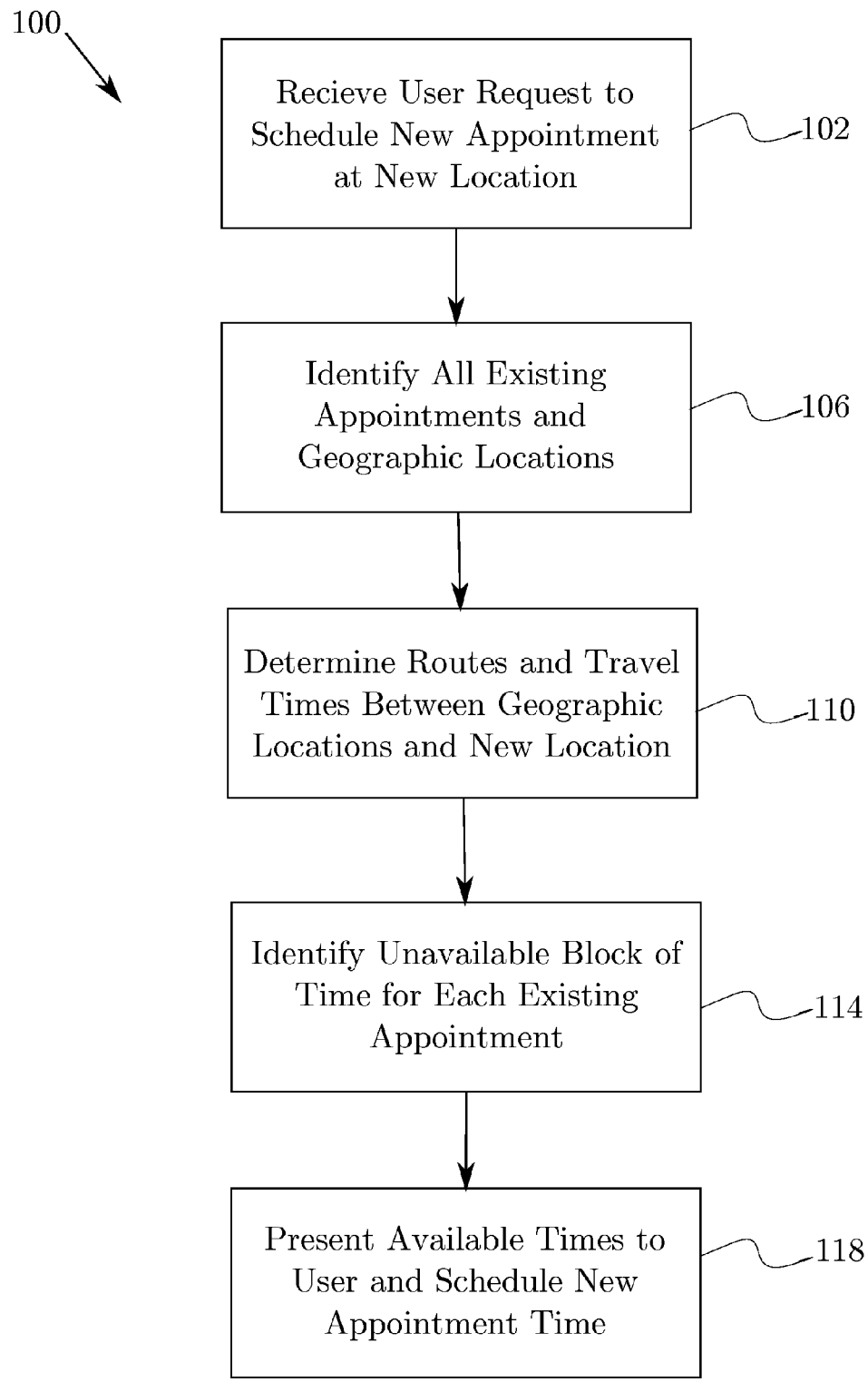
FIG. 1 is a flowchart illustrating an embodiment of the invention.

A more detailed embodiment of the above-described method is illustrated is FIG. 1 at 100. There, a computer system configured as described herein to identify and schedule a new appointment in response to a user request receives a user request to schedule a new appointment at a new location (102). In some embodiments, the new appointment is defined by a starting time and an ending time to define thereby an appointment duration; alternatively, the appointment can be defined by providing a start (or end) time and a duration. In some embodiments, the request is prepared and sent by a user using a computer that executes instruction to provide a user interface configured to prompt the use for essential and optional information for scheduling an appointment as illustrated by examples described hereinbelow. In other embodiments, the user can communicate with an agent or other third party who provides he necessary computer inputs. Still other methods and apparatus to enable the user to provide such requisite and optional information will be familiar to those having ordinary skill in the art. The information is received from the user (or agent's) computer over a suitable communications system that is effective to carry out the operations described herein. Examples of such systems are described hereinbelow. All of the foregoing details can be implemented by those having ordinary skill in the art using the guidance provided by the specification herein.

Following receipt of the user's information provided at 102, the computer system then identifies all existing appointments, i.e., all appointments previously scheduled between the starting and ending times provided by the user (also referred to herein as "old appointments"), and their associated geographical locations (106). Methods and systems for performing such identifications using electronic computer systems will be familiar to those having ordinary skill in the art. From this data, the system continues to determines one or more routes and travel time(s) from each location to the new location provided by the user or agent (110). Methods and systems for performing such identifications using electronic computer systems will be familiar to those having ordinary skill in the art. In one embodiment, the invention includes implementation of the following pseudo-code to determine driving duration:

```
import java.io.*;
import java.net.*
import java.util.HashMap;
import javax.xml.parsers.*;
import org.w3c.dom.*;
public class GoogleDistance {
    public static Double retrieveDuration( String
       startLatitudeLongitude,
    String endLatitudeLongitude)  throws Exception{
              String version = "2.3";
              String agent = "Mozilla/4.0";
              String respText = " "
                      String apiEndPoint = "http://maps.
                         googleapis.com/maps/api/
                         directions/xml";
                  System.setProperty("java.net.
                      useSystemProxies", "true");
                  String data =   "origin=" +  URLEncoder.
                      encode(startLatitudeLongitude) + "&
                      destination=" +
     URLEncoder.encode(endLatitudeLongitude) + "&sensor=false";
                  URL postURL = new URL(apiEndPoint + "?" +
                     data);
                  HttpURLConnection conn = (HttpURLConnection)
                      postURL.openConnection( );
              conn.setConnectTimeout(1000);
              conn.setDoInput (true);
              conn.setDoOutput (true);
              conn.setRequestProperty( "User-Agent", agent
                  );
              conn.setRequestMethod("GET");
              Double duration;
              DataInputStream in = new DataInputStream (conn.
                  getInputStream( ));
              int rc = conn.getResponseCode( );
              if ( rc != −1) {
                      DocumentBuilderFactory dbf =
                          DocumentBuilderFactory.
                          newInstance( );
                      dbf.setValidating(false);
                      dbf.setIgnoringComments(false);
                      dbf.
                          setIgnoringElementContentWhitespace
                          (true);
                      dbf.setNamespaceAware(true);
                  DocumentBuilder docBuilder = null;
                      docBuilder = dbf.newDocumentBuilder
                          ( );
                  org.w3c.dom.Document xmlDoc =
                      docBuilder.parse(in);
                      NodeList myList = xmlDoc.
                         getElementsByTagName("duration");
             if (myList.getLength( ) > 0){
                 Node myDurationNode = myList.item(myList.getLength
                     ( )−1);
                 Element myDurationElement = (Element)
                     myDurationNode;
                 NodeList myDurationValueList = myDurationElement.
                     getElementsByTagName("value");
                 Node myDurationValueElement = (Element)
                     myDurationValueList.item(0);
                 NodeList textDVList = myDurationValueElement.
                     getChildNodes( );
```

-continued

```
        String durationText = ((Node) textDVList.item(0)).
           getNodeValue( ).trim( );
           duration = Double.valueOf(durationText);
      } else {
           duration = -1.0;
      }
                return duration;
  } else {
                Exception e = new Exception( );
           throw e;
           }
  } // end retrieveDuration
  } // end class GoogleDistance
```

All of the foregoing details can be implemented by those having ordinary skill in the art using the guidance provided by the specification herein. Still other methods and means for providing equivalent instructions will be understood by those having ordinary skill in the art.

The computer system then identifies, using the methods described hereinbelow with the techniques, tools, and knowledge available to those having ordinary skill in the art, an "unavailable" block of time for each existing appointment (114). In some embodiments, described in more detail below, the block of unavailable time is determined by appending and prepending the travel time associated with each route between the old and new appointments, to each block of time reserved for each old appointment. Finally, the system presents the available time or times, or a statement that no time is available, to the user; if a time is available, then a new appointment is scheduled (118). All of the foregoing details can be implemented by those having ordinary skill in the art using the guidance provided by the specification herein.

In more specific embodiments of the invention, each of the current appointments has an associated block of reserved time, and the method further comprises determining under computer control at least one block of unavailable time associated with each of the current appointments by appending and prepending the travel time to the associated block of reserved time for each of the current appointments. Such an embodiment is illustrated at 200. There, a block of time to be scheduled (201), i.e., a new appointment request defined as described above, is compared against the existing appointments (204 and 208) at line I, in which the solid black horizontal line represents the time from the beginning (left solid vertical black line) and end (right solid vertical black line) of the day or other relevant period in which appointments are scheduled. At line II, the existing appointments are augmented by travel times that are appended (212 and 220) and prepended (216) as described herein. Line III illustrates the gaps between the resulting augmented appointment blocks as "available time" in which a new appointment can be scheduled. As described further herein, at line IV the available time presented to the user (228) is one that is compatible with the original request (201). All of the foregoing details can be implemented by those having ordinary skill in the art using the guidance provided by the specification herein.

More specific embodiments further comprise determining under computer control a new appointment block of time determined by the new appointment desired start time and the new appointment desired end time, and removing the at least one block of unavailable time from the new appointment block of time. Still more specific embodiments further comprise receiving a new appointment confirmation from the first party. Yet more specific embodiments still further comprise creating a confirmed new appointment corresponding to the new appointment confirmation. These details can be implemented by those having ordinary skill in the art using the guidance provided by the specification herein.

In other embodiments, the methods just described are extended to handle scheduling a new appointment among multiple provider schedules. In one embodiment, the above-described current appointments include a plurality of current schedules corresponding to a plurality of potential attendees including the attendee; and the computer-implemented method further comprises identifying at least one schedule from the plurality of current schedules that can at least approximately accommodate the new appointment request. In more specific embodiments, the at least one available time option is determined using the at least one schedule from the plurality of current schedules. All of the foregoing details can be implemented by those having ordinary skill in the art using the guidance provided by the specification herein.

FIGS. 3A and 3B illustrates a non-limiting example of such methods for generating a new appointment among multiple schedules. Starting with FIG. 3A at 300, as described above, a user request is received (302). For each schedule all existing appointments and geographical locations are determined (306), as well as the corresponding routes and travel times (310). For each schedule, the available block(s) of time (if any) are identified (314), for example by appending and prepending travel times and then removing the unavailable blocks of time as described above. Moving to FIG. 3B, at 318 available times are presented to the user, who chooses a new time to schedule. The schedules that can accommodate the new appointment are then identified (324). Exemplary pseudocode for determining schedules (i.e., "schedule sets") is provided below.

```
Class ValidScheduleSetGenerator {
solutionScheduleSets = null;
public getValidShedulesSets(Schedules) {
Appointments = null;
for (i = 0 ; i < Schedules.length; i++) {
Appointments.add(Schedules[i].getAppointments( ));
} // end for
schedule(Appointments, Schedules);
return solutionScheduleSets;
} // end getValidScheduleSets
private schedule (Appointments, Schedules) {
if(Appointments.length == 0) {
solutionScheduleSets.add(Schedules); //Solution reached
} // end if
for ( i = 0 ; i < Schedules.length; i++) {
if (Schedules [i].noConflict(Appointments[0])) {
Schedules[i].place(Appointments[0]);
schedule(Appointments.remove(Appointments[0]), Schedules);
Schedules[i].delete(Appointments[0]);
} // end if
} // end for
return;
} // end schedule
} // end Class
solutionScheduleSets = null;
schedule (Appointments, Schedules ) {
if(Appointments.length == 0) {
solutionScheduleSets.add(Schedules); //Solution reached
}
for (i = 0; i < Schedules.length; i++) {
if (Schedules[i].noConflict(Appointments[0])) {
Schedules[i].place(Appointments[0]);
schedule(Appointments.remove(Appointments[0]), Schedules);
Schedules[i].delete(Appointments[0]);
}
}
```

```
    return;
}
```

Continuing with the discussion of FIG. 3B, a schedule to include the new appointment is selected (326); and the new appointment is scheduled (330). All of the foregoing details can be implemented by those having ordinary skill in the art using the guidance provided by the specification herein. Still other methods and means for providing equivalent instructions will be understood by those having ordinary skill in the art.

The procedure just described is illustrated in FIG. 4 at 400, which illustrates the case for adding a new appointment (Requested Time 402) for two possible schedules, A and B with Appointments A1 and A2, and B1 and B2, respectively. FIG. 4 is analogous to the scheme illustrated in FIG. 2, with the exception that line I is omitted. Starting at line II, which illustrates the appointments with the travel times appended and prepended as described. Thus, Schedule A includes Appointment A1 404 with appended travel time 406 and Appointment A2 408 with prepended travel time 410; Schedule B includes Appointment B1 412 with appended travel time 414 and Appointment B2 416 with appended and prepended travel times 418 and 420, respectively. At line III, the resulting Available Times 424, 426, and 430 are identified. At line IV, since only one Available Time (426) satisfies the length (and other requirements) of the Requested Time (402), that block is presented to the user (432). All of the foregoing details can be implemented by those having ordinary skill in the art using the guidance provided by the specification herein.

FIG. 5 at 500 illustrates the case for which neither Schedule A nor Schedule B described above (FIG. 4) can accommodate a new appointment (Requested Time 502). Starting at line II, which illustrates the appointments with the travel times appended and prepended as described. Thus, Schedule A includes Appointment A1 504 with appended travel time 506 and Appointment A2 508 with prepended travel time 510; Schedule B includes Appointment B1 512 with appended travel time 514 and Appointment B2 516 with appended and prepended travel times 518 and 520, respectively. At line III, the resulting Available Times 524, 526, and 530 are identified. At line IV, since none of the Available Times satisfies the length (and other requirements) of the Requested Time (502), no available time can be presented to the user. All of the foregoing details can be implemented by those having ordinary skill in the art using the guidance provided by the specification herein.

Other embodiments of the invention include the methods illustrated with respect to FIGS. 4 and 5 described above, and further comprising altering under computer control the plurality of current schedules by rearranging the current appointments of the plurality of current schedules to accommodate the new appointment, more specifically, determining under computer control at least one schedule that can accommodate the new appointment, and, still more specifically, further comprising adding the new appointment to the at least one schedule that can accommodate the new appointment. One example of these embodiments is shown in FIGS. 6A and 6B.

Starting with FIG. 6A at 600, as described above, a user request is received (602). A set of possible schedules is generated by rearranging the existing schedules as described herein (604). For each schedule all existing appointments and geographical locations are determined (606), as well as the corresponding routes and travel times (606). For each schedule, the unavailable block(s) of time (if any) are identified (608), for example by appending and prepending travel times and then removing the unavailable blocks of time as described above. At 610 available times are presented to the user, who chooses a new time to schedule. All of the foregoing details can be implemented by those having ordinary skill in the art using the guidance provided by the specification herein.

Moving to FIG. 6B, the system receives a selected new appointment time from the user (612). A set of schedules that can accommodate the new appointment are then identified (614). Exemplary pseudocode for determining schedules (i.e., "schedule sets") is provided above. The pre-existing schedules are rearranged to identify new schedules that can accommodate the new appointment (616). A set of schedules that can accommodate the new appointment is identified and a particular schedule to which the new appointment is added is selected (618). The new appointment is then scheduled (620). All of the foregoing details can be implemented by those having ordinary skill in the art using the guidance provided by the specification herein.

The rearrangement of schedules is illustrated in FIGS. 7A-7C. Starting with FIG. 7A at 700, a Block to Schedule (702) is applied to Schedules A and B, with respective Appointments A1 and A2 (706 and 710) and Appointments B1 and B2 (714 and 718). In FIG. 7B, at 750 a set of schedules is created by swapping Appointment A2 with Appointment B2. In FIG. 7C, appending and prepending as described above (720-730) provides Available Times 740-746. All of the foregoing details can be implemented by those having ordinary skill in the art using the guidance provided by the specification herein.

One exemplary method for rearranging and creating sets of schedules is shown at 800 in FIG. 8. Starting at 804, the number of schedules is determined (808) and all appointments are identified (812). If no more appointments remain (820), then the schedule set is placed in a results set (824); otherwise, a determination is made as to whether any schedules remain (828). If no further schedules remain, then the process stops; otherwise, moving to FIG. 8B, at 832 a determination is made to schedule an appointment using the methods described herein; if the answer is "no", then control moves back the determination at 828. If the answer to the query at 832 is "yes", then the appointment is placed on the schedule (836) and (840) a copy of the schedules and list of appointments is passed recursively to 816. Upon return from the recursive call, the appointment is deleted (844) and control is again passed to 828. The process so described continues until termination. All of the foregoing details can be implemented by those having ordinary skill in the art using the guidance provided by the specification herein.

Figure 9A:
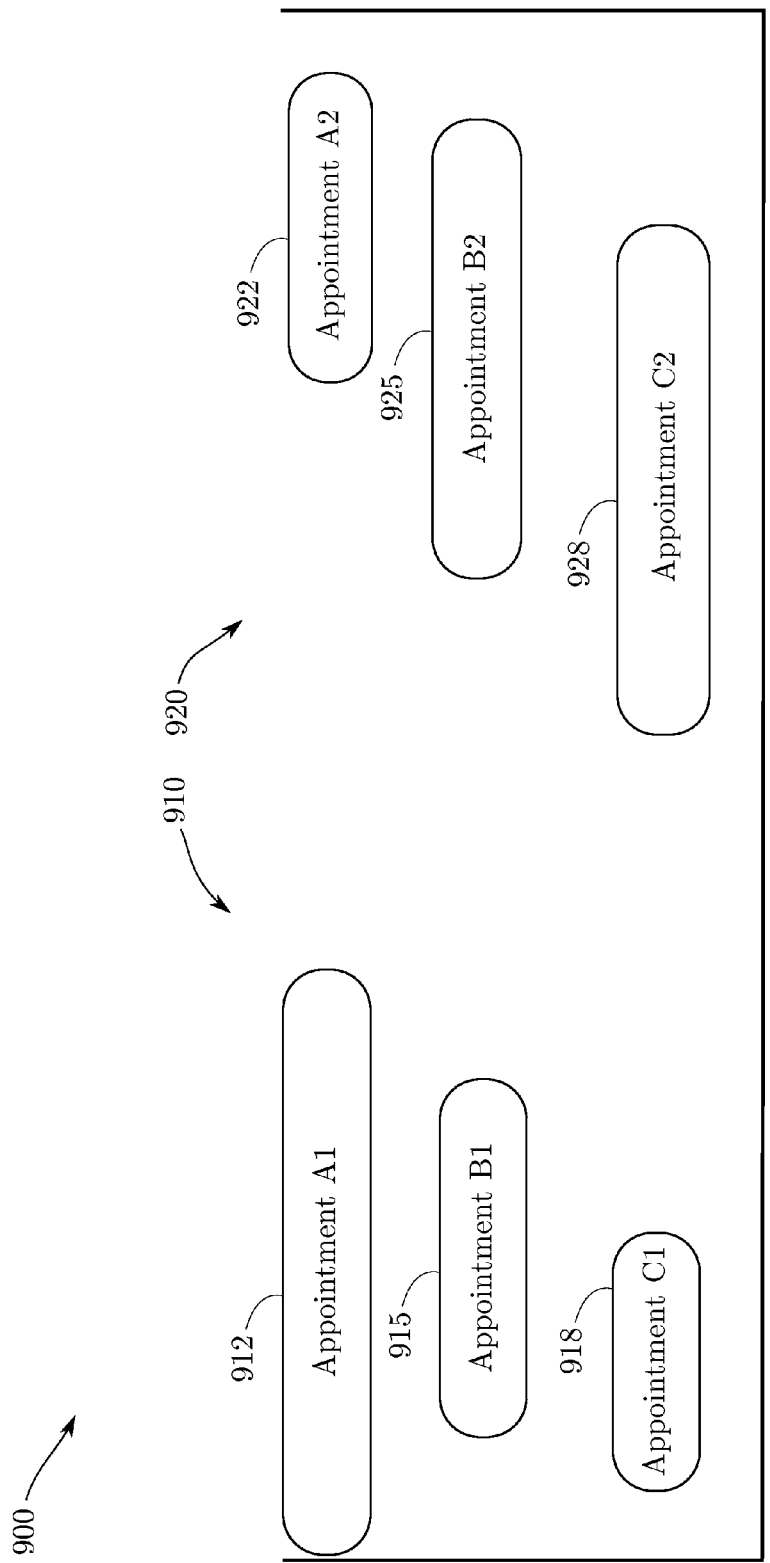
Figure 9B:
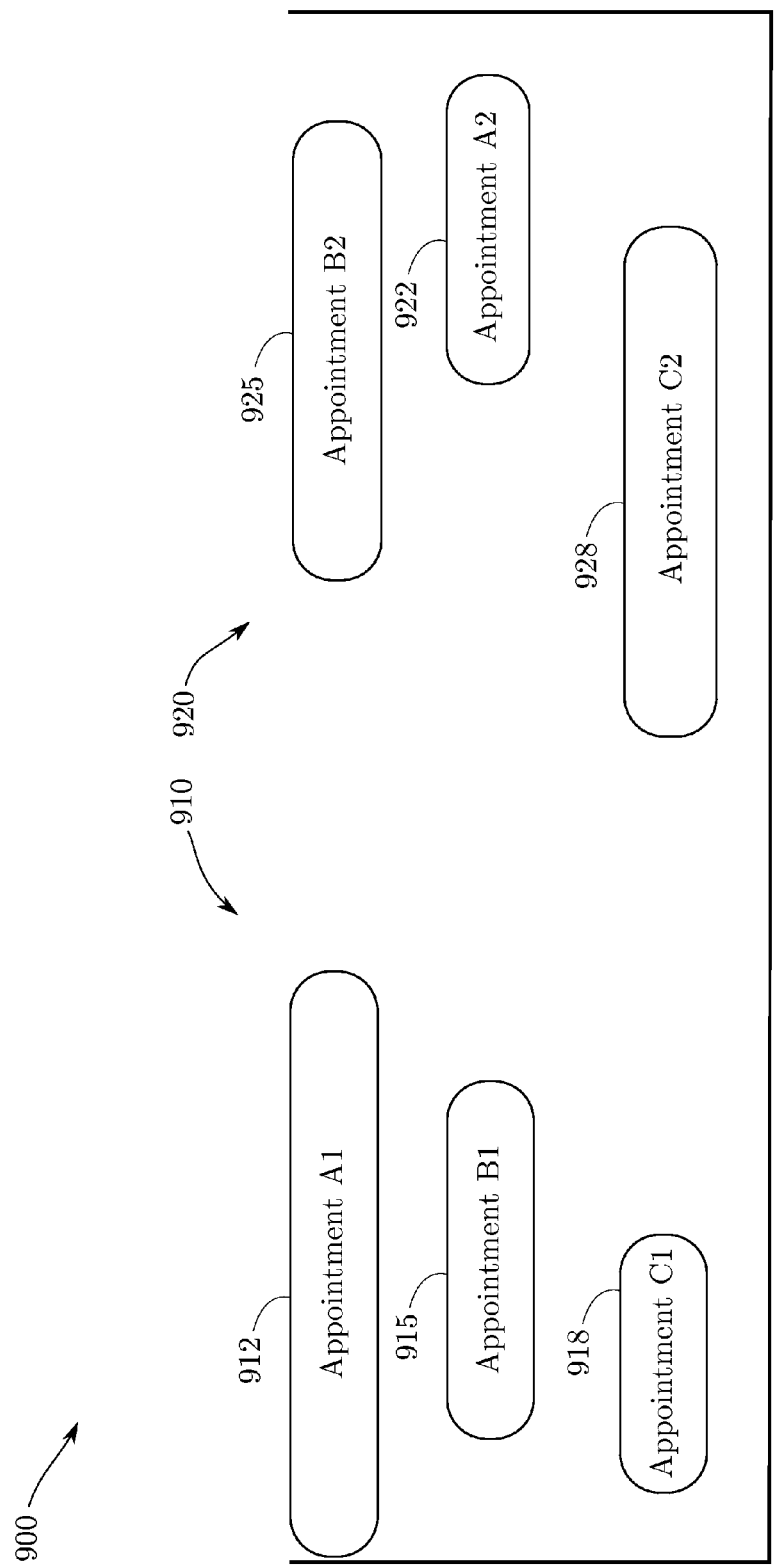
Figure 9C:
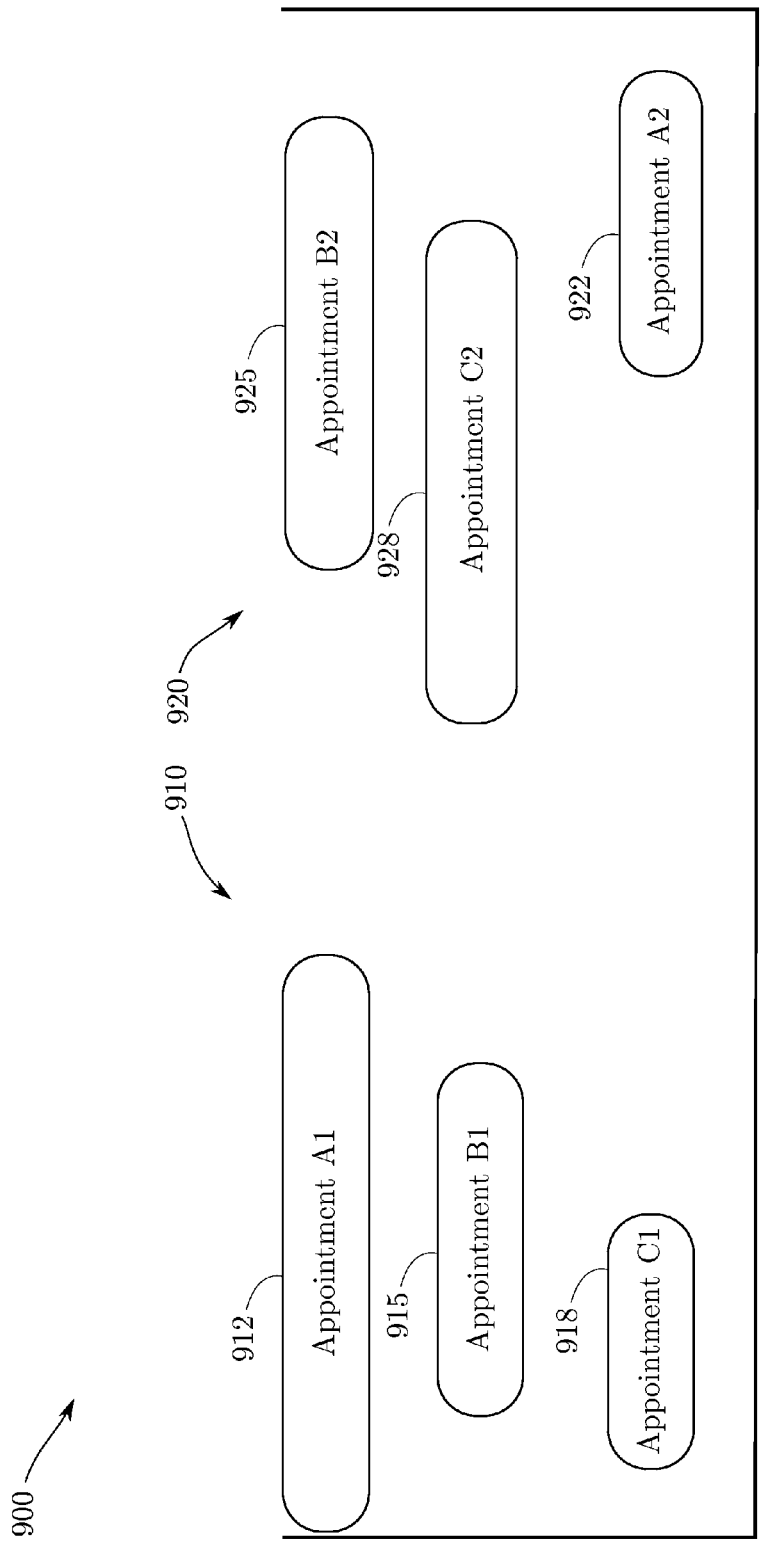
Figure 9D:
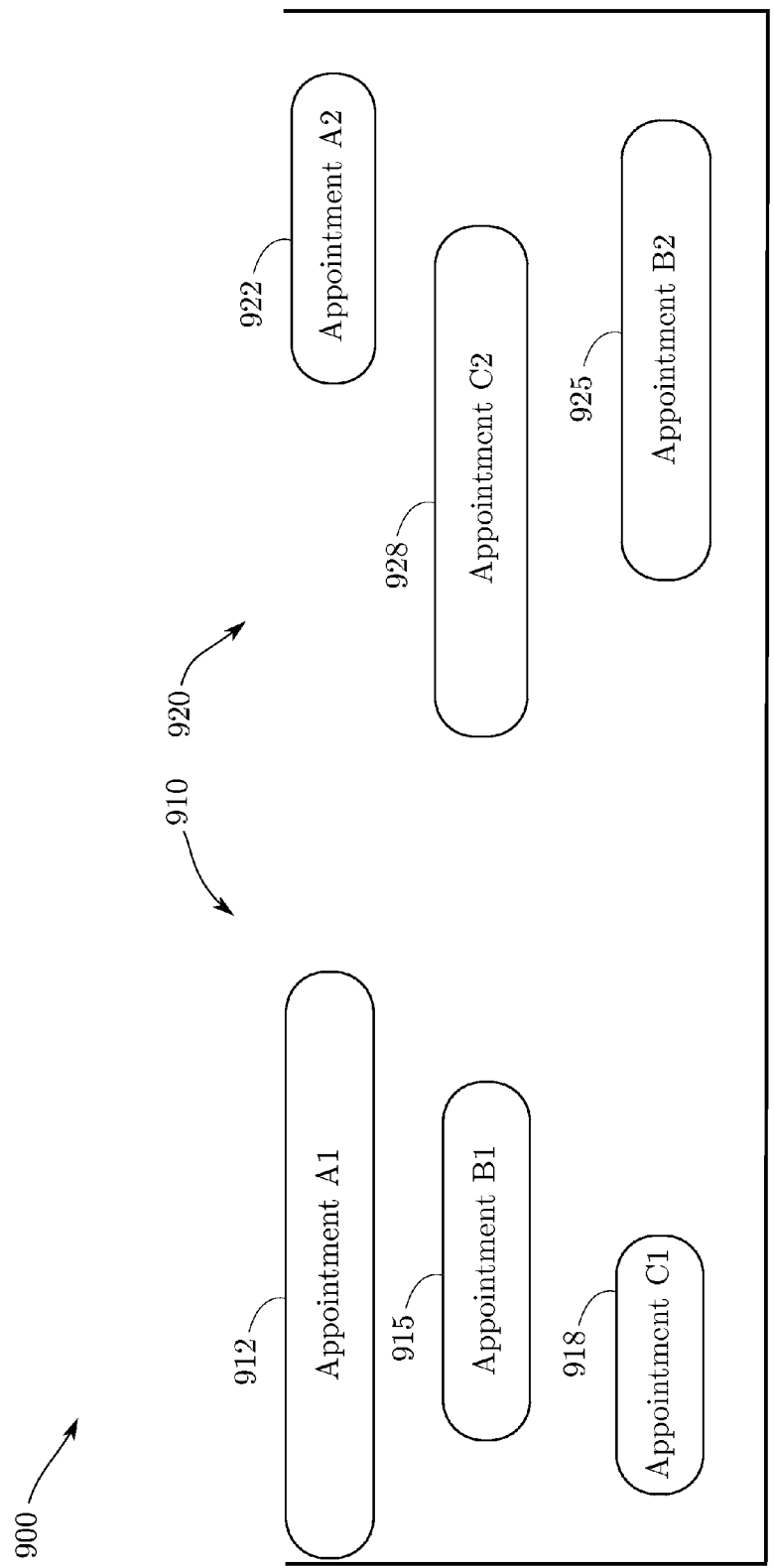
Figure 9E:
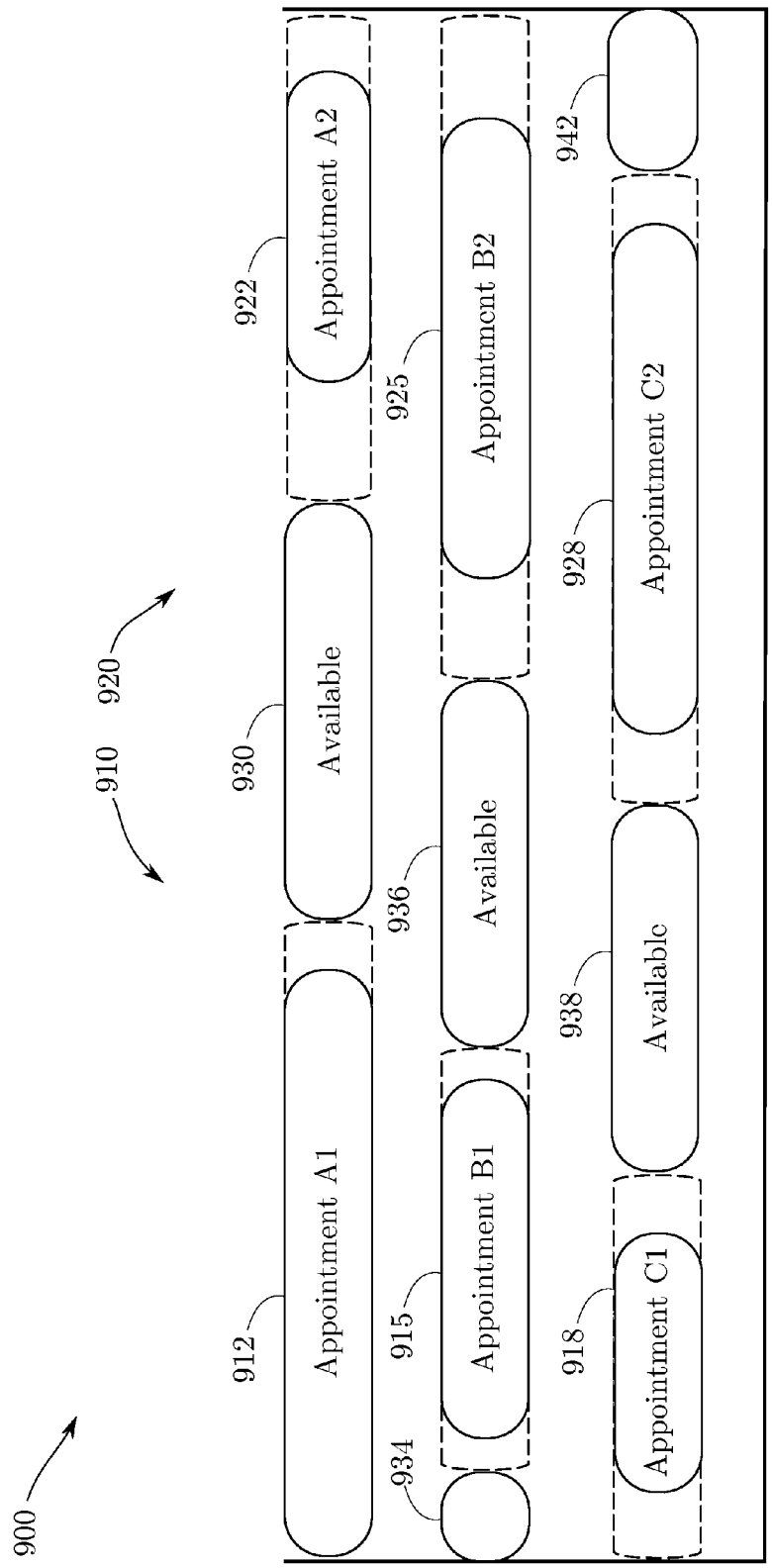
Figure 9F:
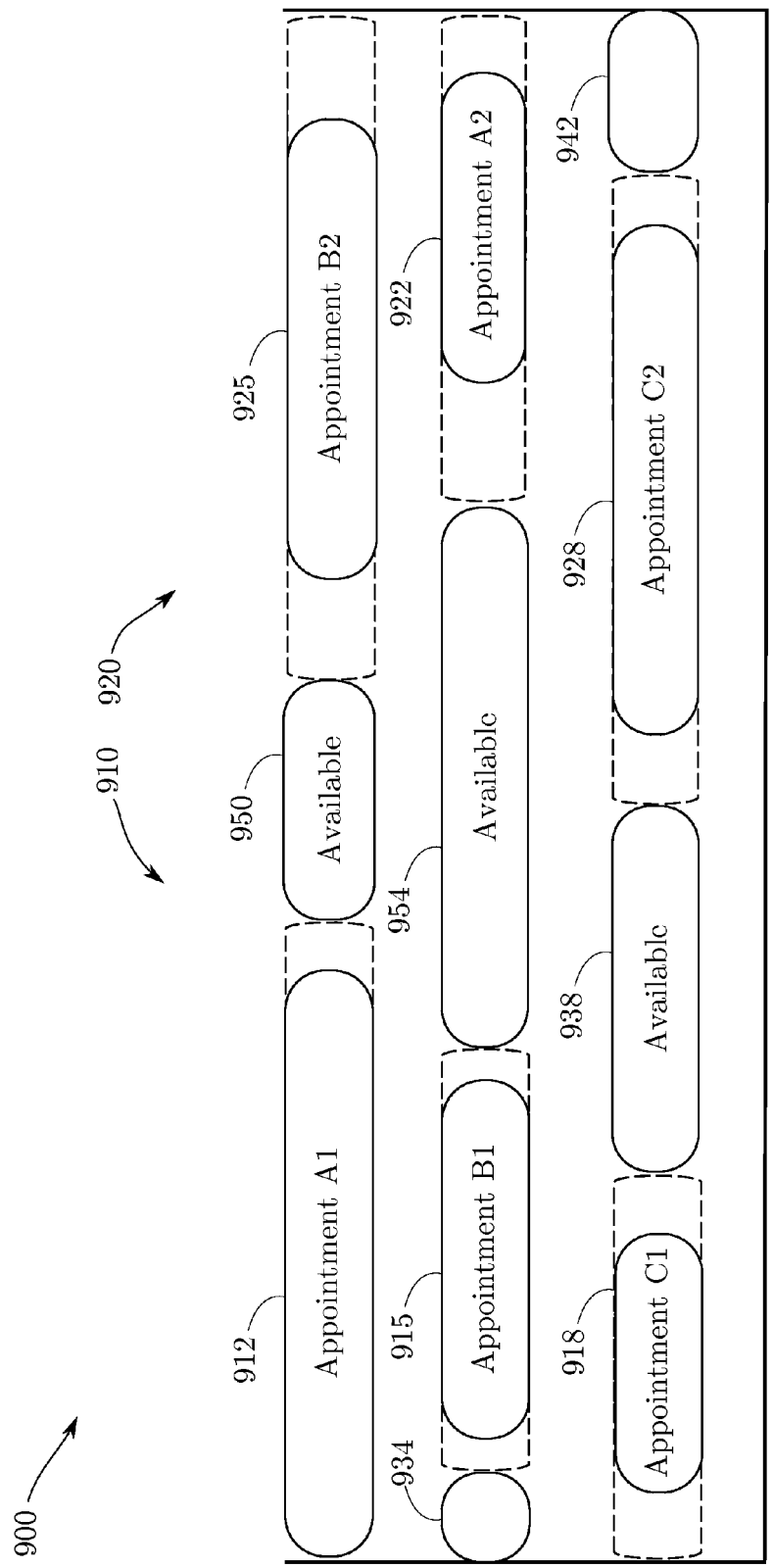
Figure 9G:
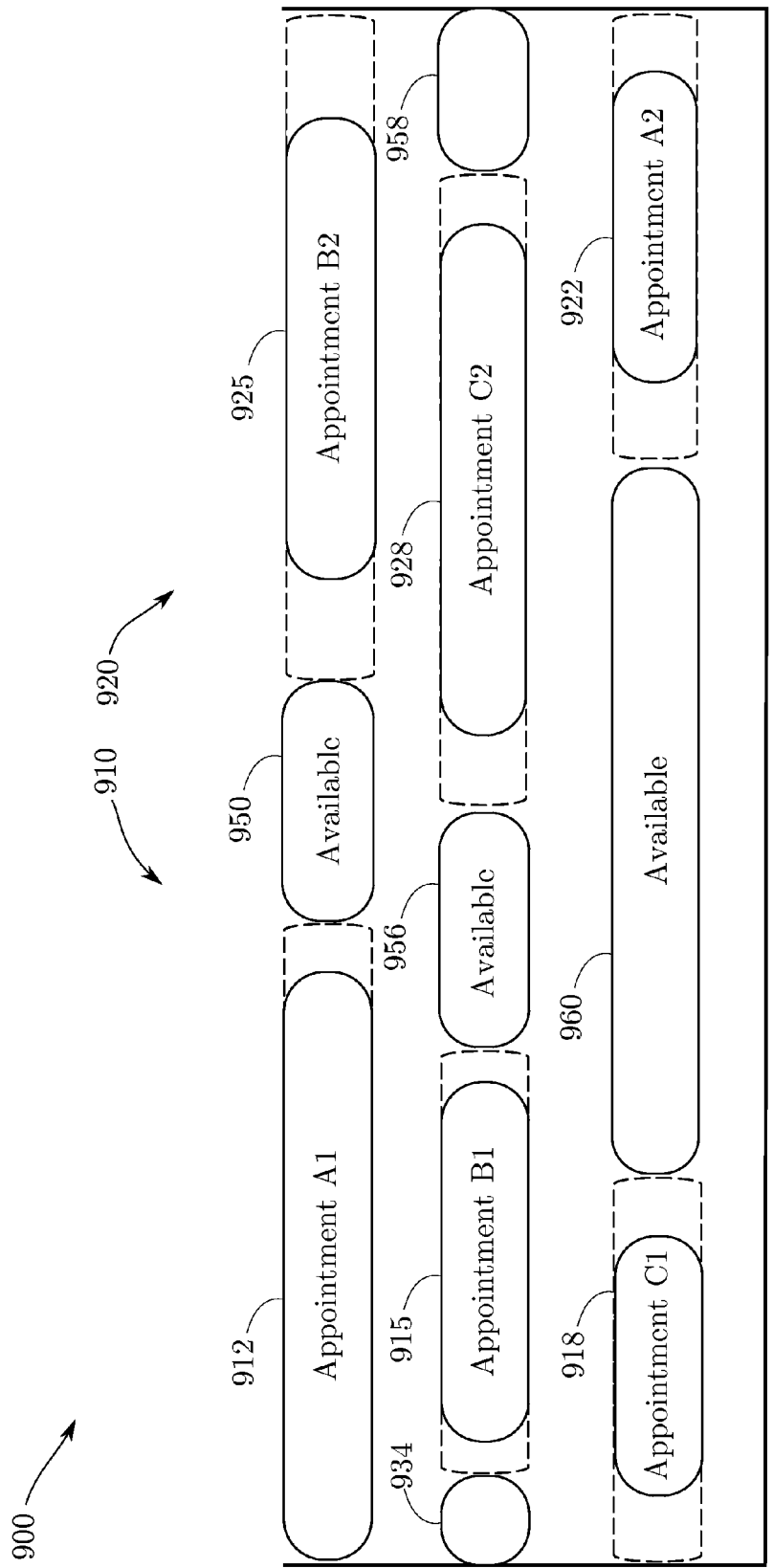
Figure 9H:
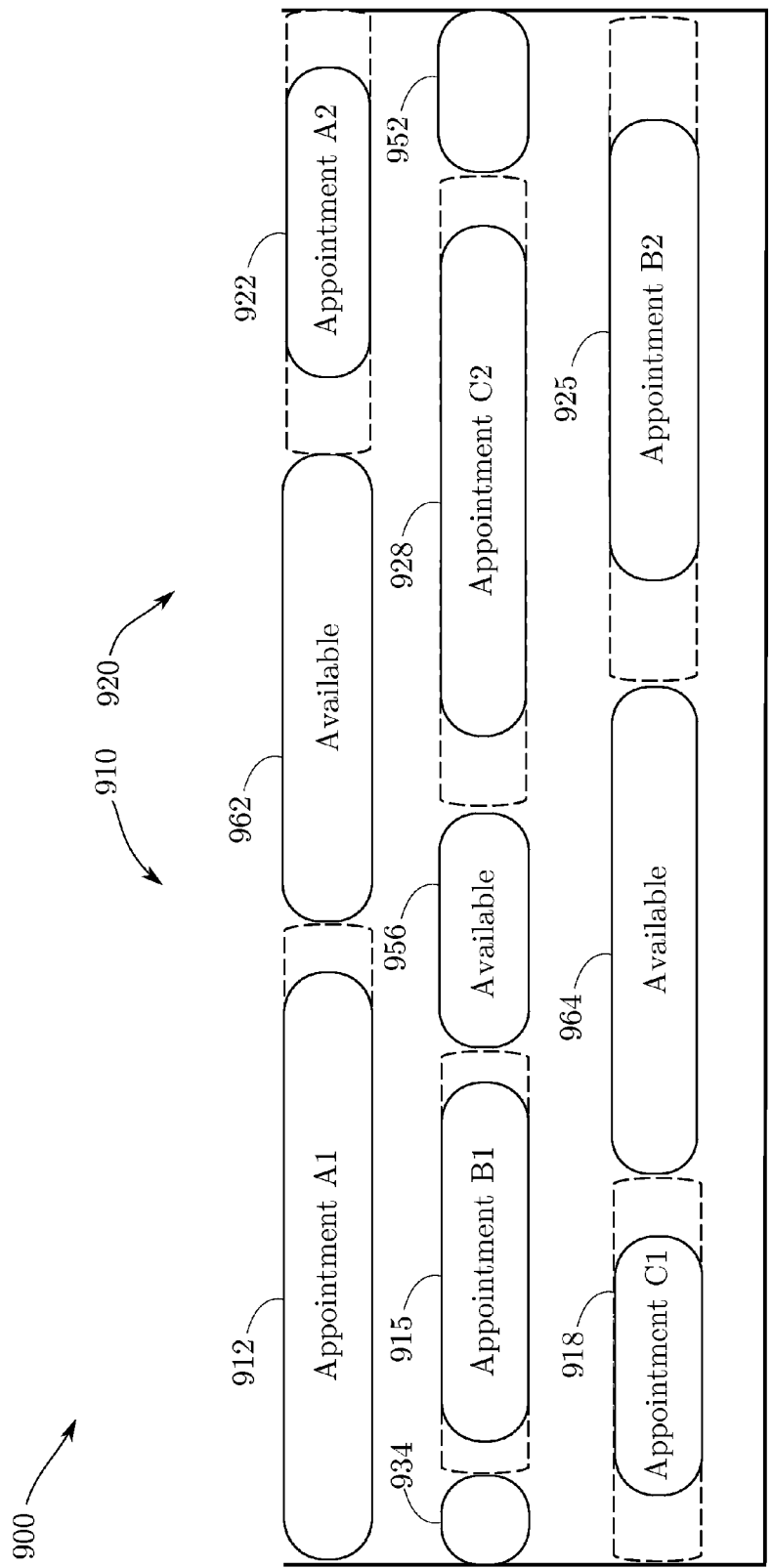

FIGS. 9A-9H illustrate the process described in FIGS. 8A and 8B. Starting at 900 in FIG. 9A, three schedules, A, B, and C are shown with Appointments A1 and A2 (912 and 922), Appointments B1 and B2 (915 and 925), and Appointments C1 and C2 (918 and 928), divided into two columns 910 and 920. In FIG. 9B, Appointment A2 and Appointment B2 are exchanged. In FIG. 9C, Appointment A2 and Appointment C2 are exchanged. In FIG. 9D, Appointment A2 and Appointment B2 are again exchanged. FIG. 9E shows the appended and prepended times applied to each appointment in FIG. 9A and the corresponding Available Times 930-942. FIG. 9F shows the appended and prepended times applied to each appointment in FIG. 9B and the corresponding new Available Times 950 and 954. FIG. 9G shows the appended and prepended times applied to each appointment in FIG. 9C and the corresponding new Available Times 956-960. FIG. 9H shows the appended and prepended times applied to each appointment in FIG. 9D and the corresponding new Available Times 962 and 964. All of the foregoing details can be implemented by those having ordinary skill in the art using the guidance provided by the specification herein.

FIGS. 10A-10C illustrate a process for determining the start time for an appointment, if one is available. In FIG. 10A, a new appointment block 1002 is compared against Available Times 1005-1020 shown in region 1001. Since none of the Available Times is sufficient to accommodate the new appointment block, then the user is not presented with any scheduling option (1003). In FIG. 10B, the new appointment 1050 is short enough to be compatible with Available Times 1005 and 1015, as shown at 1003. Comparison of the duration of the new appointment with the durations of Available Times 1005 and 1015 shows that the durations of the new appointment and Available Time 1015 are identical, while Available Time 1005 is longer. Thus, a new appointment can be scheduled right when Available Time 1015 begins (1020), or in the window shown at (1025). FIG. 10C shows a similar result, but wherein each of the Available Times can accommodate the new appointment yielding possible starting times indicated by 1020-1030. All of the foregoing details can be implemented by those having ordinary skill in the art using the guidance provided by the specification herein.

FIGS. 11A-11C illustrate exemplary embodiments for defining and offering user choices for selecting a new appointment time. FIG. 11A at 1100 illustrates a set of available start times 1101, 1104, and 1103) derived as described herein above laid on to a 9-to-5 daily schedule. FIG. 11B shows a superposition of hours over the available start times. FIG. 11C illustrates a dialog box with radio buttons for the available start times. The user selects a radio button (here, 2:00 PM) to choose the desired start time and thereby schedule the appointment. Still other methods for defining and presenting user choices will be apparent to those having ordinary skill in the art. All of the foregoing details can be implemented by those having ordinary skill in the art using the guidance provided by the specification herein.

FIGS. 13A and 13B illustrate additional examples for a user interface. FIG. 13A illustrates one non-limiting example to enable a user information for defining a new appointment location and date for a singing telegram. The figure shows a Web-browser-type window in a standard window-based computer application, showing the typical program menu commands (File, Edit, Favorites, Tools, Help) at the top, a universal reference locator entry window and browser control button below the menu commands, and dialog boxes for entering name, location information, and a date further below. A button labeled "Schedule It!" is at the very bottom. Upon entering the requested information into the dialog boxes for the location and date, activating the button relays the information to a computer processor that determines possible appointment times as described herein. The result is shown in FIG. 13B, which shows a browser window as described for FIG. 13A, but now with a series of radio buttons by which the user can select an available start time as described above with respect to FIG. 11C. All of the foregoing details can be implemented by those having ordinary skill in the art using the guidance provided by the specification herein.

6.2 Computer Systems and Non-Transitory Computer-Readable Media of the Invention In another aspect, the present invention provides computer systems configured to perform electronically the operations for scheduling appointments described herein. As will be understood by those having ordinary skill in the art, this aspect of the invention can be implemented in digital electronic circuitry, or in computer hardware, firmware, software, or in combinations thereof. As will be appreciated by those having ordinary skill in the art, the use of electronic computers enables the exchange and manipulation of data at rates far beyond the capacity of humans, with an error rate that is far below that for human computation and data manipulation. Implementing the present invention on electronic computing devices therefore enables performance that enhances the practical and economic utility of the invention.

Computer systems of the invention can be implemented in a computer program product tangibly embodied in a non-transitory machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on programmable systems including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; the language can be a compiled or interpreted language. Suitable processors include, by way of example, both general and special purpose microprocessors. Generally, although not exclusively, a processor will receive instructions and data from a read-only memory or a random access memory or a combination thereof. Generally, although not exclusively, a computer system in accordance with the invention will include one or more mass storage devices for storing data files; such devices include magnetic disks, such as internal hard disks and removable disks; magneto-optical disks; and optical disks. Storage devices suitable for tangibly embodying non-transitory computer program instructions and data include all forms of non-volatile memory, including by way of example semiconductor memory devices, such as, but not limited to, EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) or the like. Equivalent structures, devices, and technologies (e.g., optical computers) will be familiar to those having ordinary skill in the art, who will understand how to adapt the discussion herein to implement the invention using such equivalent technologies.

One example of a computer system in accordance with the present invention is shown at 1200 in FIG. 12. There, a computer system 1201, which represents any type of computer device capable of performing the operations herein, such as, but not limited to, a desktop, laptop, or tablet (including "pad") computer, a personal digital assistant, smart phone, or the like. Computer 1201 establishes communication with a second computer 1203 which also represents any type of computer device capable of performing the operations herein, such as, but not limited to, a desktop, laptop, or tablet (including "pad") computer, a personal digital assistant, smart phone, or the like, for transmitting and receiving electronic messages and signals in accordance with the operations described herein. The two computers communicate over a suitable communications network 1205, such as a local area network, wide area network, wireless network, or the like, including combinations thereof. Typically such network communications will be through the Internet. The provision and implementation of such computer and communications systems will be familiar to those having ordinary skill in the art.

More specifically, to provide for interaction with a user the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users. Examples of such interfaces are provided in FIGS. 11C, 13A, and 13B described above. The provision and implementation of such computer and communications systems will be familiar to those having ordinary skill in the art. As noted above, the processor can be coupled to a computer or telecommunications network, for example, an Internet network, or an intranet network, using a network connection, through which the processor can send and receive information from the network, or might output information to the network in the course of performing the above-described method steps. Such information, which is often represented as a sequence of instructions to be executed using the processor, can be received from and output to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to devices, systems or apparatus for performing the aforementioned operations. The system can be specially constructed for the required purposes, or it can be a general-purpose computer selectively activated or configured by a computer program stored in the computer. The processes presented above are not inherently related to any particular computer or other computing apparatus. In particular, various general-purpose computers can be used with programs written in accordance with the teachings herein, or, alternatively, it can be more convenient to construct a more specialized computer system to perform the required operations.

7 CONCLUSION

Thus, from the description herein those having ordinary skill in the art will understand that the present invention addresses the deficiencies of present scheduling methods. By providing for a straightforward provision of basic location and duration information, the present invention can offer scheduling choices that give the use maximum choice while also maximizing the ability of a service provider to offer services to the user.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that many additional features and alterations to the description herein can be made without departing from the spirit or scope of the invention. For example and not limitation, further embodiments can include additional flags and switches that further enhance scheduling flexibility by reflecting the fact that appointments are not always perfectly fungible, e.g., by enabling flags to indicate that certain scheduled appointments cannot be swapped at all, i.e., the provider of an existing appointment cannot be replaced or a particular provider is unable to provide all types of services. Still other options can include allowing a user to limit the ability to exchange appointments to a subset of providers or to a single particular provider. Further options can aid in conditional scheduling, such as including options to reflect weather contingencies (e.g., automatically reschedule if it's raining or snowing). Such embodiments can be implemented by those having ordinary skill in the art.

What is claimed:

1. A computer-implemented method for electronically scheduling an appointment between a first party and a second party, said computer-implemented method implemented at least in part by one or more electronic data processing devices and one or more computer memories, comprising:

providing an appointment scheduling interface for said first party;

receiving under computer control a requested appointment from said first party via said appointment scheduling interface, said requested appointment including a requested appointment location and information defining at least one period of time;

generating under computer control a first set of one or more computer data structures encoding said requested appointment location and said requested appointment time period;

storing said first set of one or more computer memory data structures in said one or more computer memories, said one or more computer memories being coupled to a computer data processing device;

retrieving from a one or more computer memories at least one current appointment and a location of said at least one current appointment for said second party, said at least one current appointment and said location of said at least one current appointment being encoded in a second set of one or more data structures stored in said one or more computer memories;

retrieving under computer control said requested appointment time period from said first set of one or more computer memory data structures in said one or more computer memories;

executing computer processor instructions to operate on said data encoded in said second set of one or more data structures to identify at least one current appointment for said second party during the at least one period of time, and a location for at least one of said at least one current appointment, and encoding said at least one current appointment in a data structure in said one or more computer memories;

executing computer processor instructions to operate on said encoding of said at least one current appointment and said data in said first set of one or more computer memory data structures to determine an interval of time between at least one of said at least one current appointment and said requested appointment based at least in part on the location of the at least one current appointment and the requested appointment location;

executing computer processor instructions to determine at least one available time option for scheduling said requested appointment based at least in part on said interval of time; and returning said at least one available time option to said appointment scheduling interface;

wherein said appointment scheduling interface presents said at least one available time option to said first party, and said first party may select a time option using said appointment scheduling interface to schedule thereby an appointment.

2. The computer-implemented method of claim 1, wherein each of said current appointments includes an associated block of reserved time, and further comprising determining under computer control at least one block of unavailable time associated with each of said current appointments by appending and prepending travel time to said associated block of reserved time for each of said current appointments.

3. The computer-implemented method of claim 2, further comprising determining under computer control a new appointment block of time determined by a new appointment desired start time and a new appointment desired end time, and removing said at least one block of unavailable time from said new appointment block of time.

4. The computer-implemented method of claim 3, further comprising receiving a new appointment confirmation from said first party.

5. The computer-implemented method of claim 4, further comprising creating a confirmed new appointment corresponding to said new appointment confirmation.

6. The computer-implemented method of claim 5, wherein said current appointments include a plurality of current schedules corresponding to a plurality of potential attendees including said first party; and said computer-implemented method further comprises identifying at least one schedule from said plurality of current schedules that can at least approximately accommodate said new appointment request.

7. The computer-implemented method of claim 6, wherein said at least one available time option is determined using said at least one schedule from said plurality of current schedules.

8. The computer-implemented method of claim 7, further comprising altering under computer control said plurality of current schedules by rearranging the current appointments of said plurality of current schedules to accommodate said new appointment.

9. The computer-implemented method of claim 8, further comprising determining under computer control at least one schedule that can accommodate said new appointment.

10. The computer-implemented method of claim 9, further comprising adding said new appointment to said at least one schedule that can accommodate said new appointment.

11. A computer-implemented method for electronically scheduling an appointment between a first party and a second party, comprising:

providing under electronic control an appointment scheduling interface for said first party;

sending electronically under computer control data encoding a new appointment request from said first party via said appointment scheduling interface, said new appointment request including a new appointment location, a new appointment desired start time, and a new appointment desired end time; and receiving electronically under computer control data encoding at least one available time option for scheduling said new appointment request, said at least one available time option having been determined by a computer-controlled process including:

identifying electronically under computer control all current appointments for said attendee between said new appointment desired start time and said new appointment desired end time, and the locations of said current appointments and encoding said all current appointments electronically in memory;

determining electronically under computer control a path and a travel time from each of said current appointments to said new appointment location and encoding said path and travel time electronically in memory; and determining electronically under computer control said at least one available time option for said new appointment request based at least in part on said interval of time and encoding said at least one available time option electronically in memory;

returning electronically under computer control said at least one available time option to said appointment scheduling interface wherein said appointment scheduling interface presents said at least one avaialbe time option to said first party, and said first party may select a time option using said appointment scheduling interface to schedule thereby an appointment.

12. The computer-implemented method of claim 11, wherein each of said current appointments has an associated block of reserved time, and further comprising determining under computer control at least one block of unavailable time associated with each of said current appointments by appending and prepending said travel time to said associated block of reserved time for each of said current appointments.

13. The computer-implemented method of claim 12, further comprising determining under computer control a new appointment block of time determined by said new appointment desired start time and said new appointment desired end time, and removing said at least one block of unavailable time from said new appointment block of time.

14. The computer-implemented method of claim 13, further comprising sending a new appointment confirmation from said first party.

15. The computer-implemented method of claim 14, further comprising creating a confirmed new appointment corresponding to said new appointment confirmation.

16. The computer-implemented method of claim 15, wherein said current appointments include a plurality of current schedules corresponding to a plurality of potential attendees including said attendee; and said computer-implemented method further comprises identifying at least one schedule from said plurality of current schedules that can at least approximately accommodate said new appointment request.

17. The computer-implemented method of claim 16, wherein said at least one available time option is determined using said at least one schedule from said plurality of current schedules.

18. The computer-implemented method of claim 17, further comprising altering under computer control said plurality of current schedules by rearranging the current appointments of said plurality of current schedules to accommodate said new appointment.

19. The computer-implemented method of claim 18, further comprising determining under computer control at least one schedule that can accommodate said new appointment.

20. The computer-implemented method of claim 19, further comprising adding said new appointment to said at least one schedule that can accommodate said new appointment.

21. A non-transitory computer-readable medium containing a computer program product, said computer program product being configured to enable a computer to schedule an appointment between a first party and a second party at least in part by one or more processing devices, said computer program product comprising:
   data and instructions for providing an appointment scheduling interface for said first party;
   data and instructions configured to enable said computer to receive a requested appointment from said first party via said appointment scheduling interface, said requested appointment including an requested appointment location and information defining at least one period of time;
   data and instructions configured to enable said computer to store said requested appointment;
   data and instructions configured to enable said computer to identify at least one current appointment for said second party during the at least one period of time, and a location for at least one of said at least one current appointment;
   data and instructions configured to enable said computer to determine an interval of time between at least one of said at least one current appointment and said requested appointment based at least in part on the location of the at least one current appointment and the requested appointment location;
   data and instructions configured to enable said computer to determine at least one available time option for scheduling said requested appointment based at least in part on said interval of time; and
   data and instructions configured to enable said computer to return said at least one available time option to said appointment scheduling interface;
   wherein said appointment scheduling interface presents said at least one avaialbe time option to said first party, and said first party may select a time option using said appointment scheduling interface to schedule thereby an appointment.

22. The computer-readable medium of claim 21, wherein each of said current appointments has an associated block of reserved time, and further comprising data and instructions to enable said computer to determine under computer control at least one block of unavailable time associated with each of said current appointments by appending and prepending said travel time to said associated block of reserved time for each of said current appointments.

23. The computer-readable medium of claim 22, further comprising data and instructions to enable said computer to determine a new appointment block of time determined by said new appointment desired start time and said new appointment desired end time, and removing said at least one block of unavailable time from said new appointment block of time.

24. The computer-readable medium of claim 23, further comprising data and instructions configured to enable said computer to receive a new appointment confirmation from said first party.

25. The computer-readable medium of claim 24, further comprising data and instructions configured to enable said computer to create a confirmed new appointment corresponding to said new appointment confirmation.

26. The computer-readable medium of claim 25, wherein said current appointments include a plurality of current schedules corresponding to a plurality of potential attendees including said attendee; and said computer-readable medium further comprises identifying at least one schedule from said plurality of current schedules that can at least approximately accommodate said new appointment request.

27. The computer-readable medium of claim 26, wherein said at least one available time option is determined using said at least one schedule from said plurality of current schedules.

28. The computer-readable medium of claim 27, further comprising data and instructions configured to enable said computer to alter under computer control said plurality of current schedules by rearranging the current appointments of said plurality of current schedules to accommodate said new appointment.

29. The computer-readable medium of claim 28, further comprising data and instructions configure to enable said computer to determine under computer control at least one schedule that can accommodate said new appointment.

30. The computer-readable medium of claim 29, further comprising data and instructions configured to enable said computer to add said new appointment to said at least one schedule that can accommodate said new appointment.

31. A computer system for scheduling an appointment between a first party and a second party, said system implemented at least in part by one or more processing devices, said system comprising:
   a computer-controled appointment scheduling interface for said first party;
   a computer-controlled receiver configured to receive a requested appointment from said first party via said appointment scheduling interface, said requested appointment including an requested appointment location and information defining at least one period of time;
   a computer-implemented data store configured to store said requested appointment;
   a computer processor configured to execute computer processor instructions to identify at least one current appointment for said second party during the at least one period of time, and a location for at least one of said at least one current appointment;
   a computer processor configured to execute computer processor instructions to determine an interval of time between at least one of said at least one current appointment and said requested appointment based at least in part on the location of the at least one current appointment and the requested appointment location;
- a computer processor configured to execute computer processor instructions to determine at least one available time option for scheduling said requested appointment based at least in part on said interval of time; and
- a computer-controlled responder configured to returning said at least one available time option to said appointment scheduling interface;

wherein said appointment scheduling interface presents said at least one avaialbe time option to said first party, and said first party may select a time option using said appointment scheduling interface to schedule thereby an appointment.

32. The computer system of claim 31, wherein each of said current appointments has an associated block of reserved time, and wherein said computer system further comprises a computer processor configured to determine under computer control at least one block of unavailable time associated with each of said current appointments by appending and prepending said travel time to said associated block of reserved time for each of said current appointments.

33. The computer system of claim 32, said computer system further comprising a computer processor configured to determine under computer control a new appointment block of time determined by said new appointment desired start time and said new appointment desired end time, and removing said at least one block of unavailable time from said new appointment block of time.

34. The computer system of claim 33, said computer system further comprising a computer controlled received configured to receive a new appointment confirmation from said first party.

35. The computer system of claim 34, said computer system further comprising a computer processor configured to create a confirmed new appointment corresponding to said new appointment confirmation.

36. The computer system of claim 35, wherein said current appointments include a plurality of current schedules corresponding to a plurality of potential attendees including said attendee; and said computer system further comprises a computer processor configured to identify at least one schedule from said plurality of current schedules that can at least approximately accommodate said new appointment request.

37. The computer system of claim 36, wherein said at least one available time option is determined using said at least one schedule from said plurality of current schedules.

38. The computer system of claim 37, further comprising a computer processor configured to alter said plurality of current schedules by rearranging the current appointments of said plurality of current schedules to accommodate said new appointment.

39. The computer system of claim 38, further comprising a computer processor configured to determine under computer control at least one schedule that can accommodate said new appointment.

40. The computer system of claim 39, further comprising a computer processor configured to add said new appointment to said at least one schedule that can accommodate said new appointment.

* * * * *